(12) United States Patent
Vaisambhayana Brihadeeswara et al.

(10) Patent No.: US 12,712,359 B2
(45) Date of Patent: Aug. 18, 2026

(54) PULSED ENERGY STORAGE AND DISTRIBUTION SYSTEM

(71) Applicant: Nanyang Technological University, Singapore (SG)

(72) Inventors: Sriram Vaisambhayana Brihadeeswara, Singapore (SG); Madasamy Palvesha Thevar, Singapore (SG); Abishek Sethupandi, Singapore (SG); Radhika Sarda, Singapore (SG); Anshuman Tripathi, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 19/375,659

(22) Filed: Oct. 31, 2025

(65) Prior Publication Data

US 2026/0058464 A1 Feb. 26, 2026

Related U.S. Application Data

(63) Continuation of application No. 18/626,082, filed on Apr. 3, 2024, now Pat. No. 12,463,421.

(51) Int. Cl.
*H02J 1/102* (2026.01)
*H02J 1/12* (2026.01)
*H02M 3/158* (2006.01)

(52) U.S. Cl.
CPC ................ *H02J 1/102* (2013.01); *H02J 1/12* (2013.01); *H02M 3/1582* (2013.01)

(58) Field of Classification Search
CPC ........... H02J 1/102; H02J 1/12; H02M 3/1582
See application file for complete search history.

(56) References Cited

U.S. PATENT DOCUMENTS

2014/0172182 A1 6/2014 Subbotin et al.
2019/0103754 A1 4/2019 Mali et al.
(Continued)

FOREIGN PATENT DOCUMENTS

JP 2017-169349 A 9/2017

OTHER PUBLICATIONS

PCT International Search Report and the Written Opinion mailed Jun. 10, 2025, issued in related International Application No. PCT/US2025/022820 (11 pages).

*Primary Examiner* — Carlos Amaya
(74) *Attorney, Agent, or Firm* — Sheppard Mullin Richter & Hampton LLP

(57) ABSTRACT

A system stores and distributes electric energy. The electric energy includes pulsed energy. The system includes one or more energy sources to store electric energy, one or more converters to distribute first electric energy among the energy sources and distribute second electric energy from the energy sources to one or more entities, interfaces coupled to the one or more energy sources and the one or more converters, and a controller system that performs operations. These operations include receiving a demand for the second electric energy from a particular entity, the demand indicating one or more electric characteristics of the second electric energy and one or more entity characteristics of the particular entity. The operations include, after receiving the demand, controlling the one or more converters to distribute the second electric energy from the one or more energy sources according to the one or more electric characteristics, the one or more entity characteristics, and one or more energy characteristics of the one or more energy sources.

21 Claims, 21 Drawing Sheets

(56) References Cited

U.S. PATENT DOCUMENTS

| | | | | |
|---|---|---|---|---|
| 2020/0266652 | A1* | 8/2020 | Wilhide | B60L 1/00 |
| 2023/0009016 | A1 | 1/2023 | Slepchenkov et al. | |
| 2023/0216331 | A1 | 7/2023 | Cronin | |

* cited by examiner

Controller 150
200
210
230
250

312

PULSED ENERGY STORAGE AND DISTRIBUTION SYSTEM

CROSS REFERENCE TO RELATED APPLICATION

This present application is a continuation of U.S. patent application Ser. No. 18/626,082, filed on Apr. 3, 2024, the content of which is hereby incorporated by reference in its entirety.

TECHNICAL FIELD

This disclosure pertains to a pulsed energy storage and distribution system containing one or more energy sources and one or more converters.

BACKGROUND

Applications in fields such as medicine, defense, manufacturing, and power systems rely on pulsed power, which is characterized by compression of electrical energy in both time and space. Therefore, pulsed power involves delivery of short and powerful electrical pulses with high voltage and/or current amplitudes. A power supply that delivers pulsed power ramps an output voltage and/or current to full within a timespan on an order of milliseconds or microseconds.

SUMMARY

A claimed solution rooted in computer technology overcomes problems specifically arising in the realm of computer technology, in particular, to maintenance and control of an electric system or device (hereinafter "system") that provides power or energy (hereinafter "energy") distribution, delivery or transmission (hereinafter "distribution"), such as pulsed energy distribution. The energy may be distributed to one or more entities or loads (hereinafter "entities") according to individual entity characteristics, requested energy characteristics, and/or characteristics or statuses of the electric system, thus offering a versatile solution of providing pulsed power under different scenarios, and/or situations. The electric system is modular and has a compact form factor (e.g., under 6 rack units). In some embodiments, a peak power may be limited to a certain value, such as any value between 50 kilowatts (kw) and 100 kw, or any other suitable value. The electric system contains one or more energy storage components as energy sources and converter circuitry that transforms and distributes energy from the energy storage components to the one or more entities that draw or consume energy. The electric system also includes a controller that maintains and controls operations of the electric system to facilitate bidirectional distribution of energy to and from the energy storage components.

The energy storage components may include different types of components, such as, for example, one or more batteries (e.g., lithium-ion batteries), supercapacitors, renewable energy sources such as photovoltaics, and/or other energy sources such as chargers, generators, motors, and/or substations. The lithium-ion batteries have advantages of modularity, robustness to temperature change, high energy and high power density. Supercapacitors have advantages of high power draw which is beneficial in pulsed power operations. In some embodiments, at least some of the energy storage components may supply pulsed energy. In some embodiments, the energy storage components include at least one battery and at least one supercapacitor. In some embodiments, the battery may contain cells having approximately 27 Ampere-hours (Ah) at 3.2 Volts, or any parameters within a threshold range of the aforementioned values (e.g., within +/−50 percent). In some embodiments, each cell may have between 10 Ah and 100 Ah at between 1 and 10 Volts. The battery may include a single cell, a module containing four cells, a pack containing six modules, or a system containing two packs. The supercapacitor may supply pulsed energy.

In some embodiments, the energy storage components may contain one generative or renewable (hereinafter "generative") energy source and one dependent energy source which is periodically recharged by the generative energy source. In some embodiments, the energy storage components may contain one generative energy source and one non-generative energy source. In some embodiments, the energy storage components may contain multiple generative energy sources. In some embodiments, the energy storage components may contain a primary energy source and an auxiliary energy source.

Each energy storage component may further be connected with one or more wires, lines, or connections (hereinafter "connections") to converter circuitry. The converter circuitry may include a boost converter to increase voltage and thereby increase distribution efficiency, a dual active bridge (DAB) to facilitate bidirectional distribution and galvanic isolation, and/or a buck converter to increase current and modify characteristics of the energy pulses being transmitted to the entities. The DAB may include one or more high frequency transformers (HFTs).

The controller may obtain one or more demands for energy from one or more entities. The demands may indicate or be associated with individual entity characteristics such as a type of entity. For example, the type of entity may specify whether the entity is linear (e.g., resistive) or nonlinear (e.g., a diode). The demands for energy may be associated with configuration requests such as requested energy characteristics, which may specify a particular pulsed current profile. Attributes of a particular pulsed current profile may include, without limitation, a duration of a pulse, a rise time, a fall time, a peak pulsed current value, a peak pulsed voltage value, a duty cycle, and/or a shape of a pulse to be distributed. The controller may be configured to control distribution of energy for different entities and/or different pulsed current profiles. For example, in a situation when an entity is non-linear, the controller may initially supply a charging current until a voltage of the entity reaches a threshold voltage such as a breakdown voltage, and then supply an entity current. A difference between the entity current and the charging current is that the entity current has the requested energy characteristics, while the charging current may be missing one or more of the requested energy characteristics. The controller may control or program converter circuitry to transform energy according to the requested energy characteristics prior to the energy being supplied to the entities.

Furthermore, the controller may detect problem conditions within the electric system and control operations of the electric system to adjust or adapt to the problem conditions. These problem conditions include, for example, decreased or compromised performance, faults, and/or irregularities within the electric system. In some examples, faults be manifested as an input voltage, output voltage, or total current of a converter falling outside of acceptable ranges. Other examples of faults may include an increase in interference, decrease in energy quality, an outage in at least a portion of the electric system, or a demand for energy which may exceed available energy, or cause energy depletion at one or more of the energy storage components.

Embodiments of the invention implement an electric system which includes one or more energy sources configured to store electric energy, one or more converters configured to distribute first electric energy among the energy sources and distribute second electric energy from the energy sources to one or more entities, interfaces coupled to the one or more energy sources, the one or more converters, and the one or more entities, and a controller system comprising the one or more interfaces and a controller. The controller system further comprises one or more hardware processors and memory storing computer instructions, the computer instructions when executed by the one or more hardware processors configured to perform operations. The operations include receiving a demand for the second electric energy from a particular entity, the demand indicating one or more electric characteristics of the second electric energy and one or more entity characteristics of the particular entity; and in response to receiving the demand, controlling the one or more converters to distribute the second electric energy from the one or more energy sources to the particular entity according to the one or more electric characteristics, the one or more entity characteristics, and one or more energy characteristics of the one or more energy sources. The operations further include, determining an amount of available electric energy at the one or more energy sources; and in response to determining that an amount of available electric energy at a particular energy source falls below a threshold, controlling the one or more converters and a different energy source to distribute the first electric energy from a different energy source to the particular energy source. The different energy source and the particular energy source may be comprised within the one or more energy sources. The controlling of the one or more converters and the different energy source may include activating circuitry within the one or more converters and the different energy source to permit or unblock distribution of the first electric energy.

In some embodiments, the one or more converters comprise any two selected from a group comprising a boost converter, a dual active bridge (DAB), and a buck converter.

In some embodiments, the one or more energy sources comprise a battery and a supercapacitor configured to store pulsed energy.

In some embodiments, the one or more electric characteristics comprises any of a duration of a pulse, a rise time, a fall time, a peak pulsed current value, a duty cycle, an OFF time, an ON time, and a shape of a pulse, and wherein the controlling the one or more converters to distribute the second electric energy comprises controlling the one or more converters to transform the second electric energy according to the one or more electric characteristics.

In some embodiments, the one or more entity characteristics indicate whether the particular entity is linear or non-linear.

In some embodiments, the controlling the one or more converters to distribute the second electric energy comprises: controlling the one or more converters to distribute the second electric energy in a form of a charging current to the particular entity until a voltage of the particular entity reaches a threshold voltage, wherein the charging current fails to satisfy at least one of the electric characteristics; and upon the voltage of the particular entity reaching the threshold voltage, controlling the one or more converters to distribute the second electric energy in a form of an entity current, wherein the entity current satisfies the one or more electric characteristics.

In some embodiments, the one or more energy characteristics comprises an availability of energy at the energy sources; and the controlling the one or more converters to distribute the second electric energy comprises controlling the one or more converters to draw the second electric energy from one or more particular energy sources of the energy sources based on the availability of energy.

In some embodiments, the computer instructions when executed by the one or more hardware processors are further configured to perform: determining an amount of available electric energy at the one or more energy sources; and in response to determining that an amount of available electric energy at a particular energy source falls below a threshold, controlling the one or more converters to distribute the first (e.g., surplus or predicted surplus) electric energy from a different energy source to the particular energy source.

In some embodiments, the computer instructions when executed by the one or more hardware processors are further configured to perform: monitoring for one or more faults within the electric system; and implementing a response mechanism in response to detecting a fault within the electric system.

In some embodiments, the one or more energy sources and the one or more converters comprise circuitry containing a high-resistance path through which the second electric energy initially flows to mitigate an inrush of current from the one or more energy sources to an input capacitor of the one or more converters and a low-resistance path between the one or more energy sources and the one or more converters, wherein the high-resistance path is programmed to be open when a capacitance of the input capacitor is below a threshold capacitance and the low-resistance path is programmed to be open when the capacitance of the input capacitor reaches the threshold capacitance.

Embodiments of the invention implement a method by a controller system within an electric system, the electric system comprising the electric system comprising: one or more energy sources configured to store electric energy; and one or more converters configured to distribute first electric energy among the energy sources and distribute second electric energy from the one or more energy sources to one or more entities. The controller system comprises a controller and one or more interfaces coupled to and communicating with the one or more energy sources, the one or more converters, and the one or more entities. The method comprises: receiving a demand for the second electric energy from a particular entity, the demand indicating one or more electric characteristics of the second electric energy and one or more entity characteristics of the particular entity; and in response to receiving the demand, controlling the one or more converters to distribute the second electric energy from the one or more energy sources to the particular entity according to the one or more electric characteristics, the one or more entity characteristics, and one or more energy characteristics of the one or more energy sources. The method further include, determining an amount of available electric energy at the one or more energy sources; and in response to determining that an amount of available electric energy at a particular energy source falls below a threshold, controlling the one or more converters and a different energy source to distribute the first electric energy from a different energy source to the particular energy source.

In some embodiments, the method further comprises implementing a precharging process by closing one or more first switches in a high-resistance path between the one or more energy sources and an input capacitor of the one or more converters to permit energy flow through the high-resistance path while blocking energy flow through a low-resistance path between the one or more energy sources and the one or more converters; and upon the input capacitor reaching a threshold capacitance, closing one or more second switches in the low-resistance path and opening the one or more first switches to facilitate energy flow through the low-resistance path while blocking energy flow through the high-resistance path.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 2 illustrates connections among the components of the electric system.

FIG. 3A is a circuit diagram of an electric system having a boost converter, a dual active bridge (DAB), and a buck converter, according to some embodiments of the present invention.

FIG. 3B is a diagram of a microcontroller of the boost converter shown in FIG. 3A, according to some embodiments of the present invention.

FIG. 3C is a diagram of a microcontroller of the DAB shown in FIG. 3A, according to some embodiments of the present invention.

FIG. 3D is a diagram of a microcontroller of the buck converter shown in FIG. 3A, according to some embodiments of the present invention.

FIG. 3E is a circuit diagram of a boost converter, consistent with the electric system shown in FIG. 3A, according to some embodiments of the present invention.

FIG. 3F is a circuit diagram of a DAB, consistent with the electric system shown in FIG. 3A, according to some embodiments of the present invention.

FIG. 3G is a circuit diagram of a buck converter, consistent with the electric system shown in FIG. 3A, according to some embodiments of the present invention.

DETAILED DESCRIPTION

Figure 1:
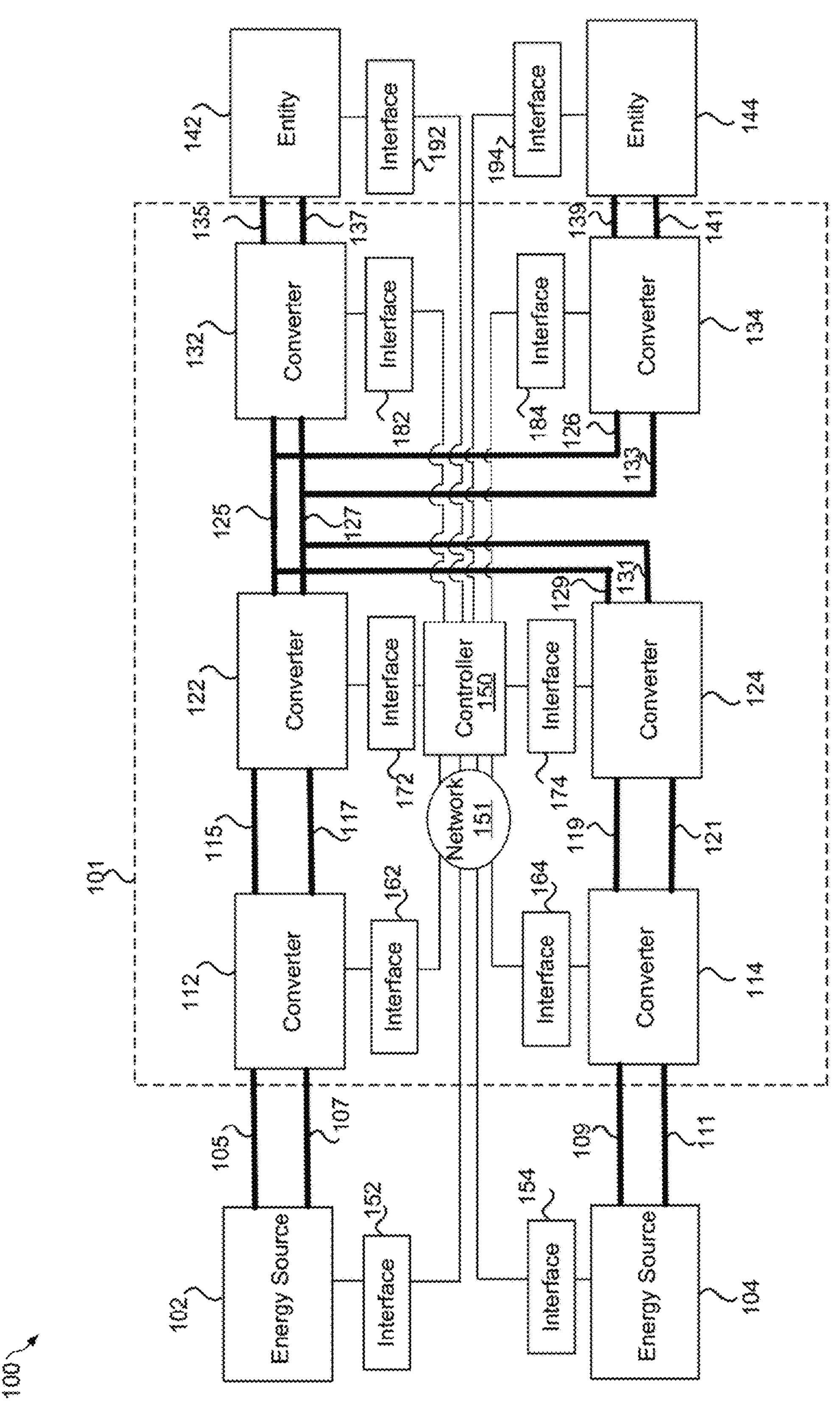
FIG. 1 is a diagram of an electric system that stores and distributes electric energy to one or more entities, according to some embodiments of the present invention. The electric system includes one or more energy sources and one or more converters.

Solutions herein relate to maintenance and control of an electric system for energy distribution. The electric system includes energy storage components that store and/or supply energy, and converter circuitry that transforms and distributes energy from the energy storage components to one or more entities that draw or consume energy from the energy storage components. The electric system also includes a controller that maintains and controls operations of the electric system to facilitate distribution of energy to and from the energy storage components in a bidirectional manner.

The energy storage components may include different types of electronic components, such as, for example, one or more batteries, supercapacitors, renewable energy sources such as photovoltaics, chargers, generators, motors, substations, and/or other energy sources. In some embodiments, the energy storage components may contain one generative energy source and one dependent energy source which is periodically charged/recharged (possibly by the generative energy source) as the dependent energy source is discharged or possibly whenever the dependent energy sources fall below a threshold level of energy. In some embodiments, the energy storage components may contain one generative energy source and one non-generative energy source. In some embodiments, the energy storage components may contain multiple generative energy sources. In some embodiments, the energy storage components may contain a primary energy source and an auxiliary energy source (that may be charged by the primary energy source or by another energy source). Each energy storage component may further be connected via one or more connections to converter circuitry, which distributes energy as needed. Each energy storage component and/or the converter circuitry may contain circuitry, such as precharge circuitry, to prevent an inrush of current that would otherwise occur when the energy storage component connects to a capacitor within the converter circuitry. The converter circuitry may include any of a boost converter, a dual active bridge (DAB), and a buck converter. The DAB may include one or more high frequency transformers (HFTs).

The controller may obtain one or more demands for energy from one or more entities. The demands may be associated with and/or indicate individual entity characteristics such as a type of entity. For example, the type of entity may specify whether the entity is linear (e.g., resistive) or non-linear (e.g., a diode). The demands may further be associated with and/or indicate configuration requests including requested energy characteristics, which may specify a particular pulsed current profile. Attributes of a particular pulsed current profile may include, without limitation, a duration of a pulse, a rise time, a fall time, a peak pulsed current value, a duty cycle, and/or a shape of a pulse to be distributed. The controller may be configured to control distribution of energy for different entities and/or different pulsed current profiles. For example, when an entity is non-linear, the controller may initially supply a charging current until a voltage of the entity reaches a threshold voltage such as a breakdown voltage, and then supply an entity current. The entity current has the requested energy characteristics, while the charging current may not have the requested energy characteristics, or be missing one or more of the requested energy characteristics, or otherwise not be adapted according to the requested energy characteristics. In some embodiments, the charging current may not be provided in a pulsed form. This specific mechanism of energy distribution conserves computing resources by reducing an amount of energy that is to be transformed until the entity reaches the breakdown voltage, and is specifically adapted to operation of a non-linear entity. Because a non-linear entity does not become conductive until the breakdown voltage is reached, a non-linear entity may be charged using different forms of energy, not necessarily having the requested energy characteristics, prior to reaching the breakdown voltage.

The controller may control converter circuitry, such as the buck converter, to transform energy pulses according to the requested energy characteristics. Furthermore, the controller may detect problem conditions within the electric system and control operations of the electric system to adjust or adapt to the problem conditions. These problem conditions include, for example, decreased or compromised performance, faults, and/or irregularities within the electric system. In some examples, faults may be manifested as a decrease in voltage, increase in interference, increase in harmonics, decrease in energy quality, an outage in at least a portion of the electric system, a demand for energy which may exceed available energy at the energy storage components. For example, if the controller detects a fault within a converter, the controller may shut down the converter or the electric system, restart operation of the converter or the electric system, and/or initiate operation of a backup or auxiliary (hereinafter "auxiliary") converter. As another example, if the controller detects a fault within an energy storage component, the controller may initiate operation of or increase extent of operation of an auxiliary energy storage component.

FIG. 1 depicts a diagram of an example electric system 100 and associated components. In particular, FIG. 1 illustrates relationships between components of the electric system 100 and control of the electric system 100. The electric system 100 may include energy sources 102 and 104 as energy storage components, and converter circuitry 101, which includes converters 112, 122, 132, 114, 124, and 134. In some embodiments, each of the energy sources 102 may contain either a battery or a supercapacitor. A supercapacitor may, while connected within the electric system 100, be charged when energy stored within the supercapacitor falls below a threshold energy. For example, a battery may distribute energy to the supercapacitor. Therefore, a supercapacitor may be both charged and discharged due to the bidirectional energy transfer capabilities of the DAB. Specifications of an example battery are shown in Table 1 below. Specifications of an example supercapacitor are shown in Table 2 below. In some embodiments, any of the parameters shown in Tables 1 and 2 may be varied within some range, such as +/−50 percent of the parameters shown in Tables 1 and 2. For example, the nominal voltage may be between 76.8V and 300.4V.

TABLE 1

Specifications of a battery are shown, which may be implemented as the energy source 102 of FIG. 1.

| Parameter | Battery Specification |
|---|---|
| Peak power (kW) | 27.5 |
| Nominal capacity (kWh) | 16.6 |
| Nominal voltage (V) | 153.6 |
| Operating Voltage range (V) | 151.2-156 |
| Dimension (mm) | 0.25 $m^3$, Approx. 800 (L) × 450 (W) × 680 (H) |
| Weight (kg) | Approx. 180 |
| Duty cycle profile | Approx. 36 seconds discharge (@27.5 kW) to charge battery & approx. 24 seconds idle & 30 seconds discharge (@27.5 kW) to supply power for 20 cycles |
| Maximum SOC window | 80% (10-90%) |
| Actual SOC window | Approx. 60% |
| Rise time (ms) | <1 |
| Cooling method | Air cooling |
| BMS functions | CAN communication with two converters & one battery charger |
| Data display (On enclosure) | Voltage, current, temperature, State of Charge (SOC), State of Health (SOH), etc. |
| Others | Manual Service Disconnect (MSD) as push button mechanismn<br>Manual ON/OFF switch and status indicator light on Battery Energy Storage System (BESS) enclosure |

TABLE 2

Specifications of a supercapacitor are shown, which may be implemented as the energy source 104 of FIG. 1.

| Parameter | Supercapacitor System Specification |
|---|---|
| Peak power (kW) | 27.5 |
| Capacitance (F) | 92.8 |
| Max. Rated voltage (V) | 160 V |
| Operating voltage range (V) | 67 V-160 V |
| Dimension (mm) | 0.1 $m^3$, Approx. 0.367 (L) × 0.470 (W) × 0.560 (H) |
| Weight (kg) | Approx. 82 kg (will increase to accommodate integration) |
| Duty cycle profile | 60 s charge (@27.5 kW) to charge supercapacitor & 30 s discharge (@27.5 kW) to supply power, for 20 pulses |
| Balancing | Passive |
| Others | Plastic Enclosure<br>Designed for up to 500,000 pulses<br>Rated for Vibration per IEC60068-2-6<br>Rated for Shock per IEC60068-2-27 |

In some embodiments, the energy source 102 may contain one generative energy source (e.g., capable of being charged on its own, without manual recharging and/or charging from a different energy source) and the energy source 104 may contain one dependent energy source which is periodically recharged by the generative energy source. For example, when an amount of energy within the energy source falls below a threshold level, and/or following a duration of time, the energy source 102 may charge the energy source 104. In some embodiments, the energy source 102 may contain one generative energy source and the energy source 104 may contain one non-generative energy source. In some embodiments, the energy storage components 102 and 104 may each contain generative energy sources. In some embodiments, the energy source 102 may contain a primary energy source and the energy source 104 may contain an auxiliary energy source.

In some embodiments, the converters 112 and 114 may be of a same type, such as a boost converter, to increase voltage from the energy sources 102 and 104. The increase of voltage increases efficiency of energy transmission. The converters 122 and 124 may also be of a same type, such as a DAB, to facilitate bidirectional energy transmission and galvanic isolation, in addition to other benefits. The converters 132 and 134 may also be of a same type, such as a buck converter, to increase a current and transform one or more characteristics of the energy prior to transmission to entities 142 and 144. In other embodiments, any of the converters 112, 114, 122, 124, 132, and 134 may be of different types. The electric system 100 may contain any number of energy sources and converters, and is not limited to the implementation shown in FIG. 1. For example, in some embodiments, multiple energy sources instead of a single energy source may be connected to a converter.

In some embodiments, the entities 142 and 144 may include any components that have or indicate a demand for energy. The entities 142 and 144 may indicate, to a controller 150, a specific energy profile of the energy to be distributed, and one or more characteristics of the entities 142 and 144. These characteristics may include whether the entities 142 and 144 are linear or non-linear. Although FIG. 1 illustrates only two converters (e.g., the converters 132 and 134) directly connected to entities, any number of converters, such as 4, 8, 16, or 32 converters, may be connected to different entities. In some examples, the electric system 100 may contain two or more boost converters each of which is connected to an energy source, two or more DABs each of which is connected to a boost converter, and up to sixteen buck converters. In some embodiments, each of the boost converters may output between 10 kilovolt Amperes (kVA) and 100 kVA, and output a voltage of approximately 180 Volts, or between 160 and 200 Volts, inclusive. In some embodiments, an output from the energy sources 102 and 104 may be approximately 150 Volts, or between 130 and 170 Volts, between 5 and 50 kilowatt hours (kwh) of energy, delivering between 10 and 100 kW of power, at a charging or discharging rate of 1.6 C-Rate. In some embodiments, each of the DABs may output between 10 kVA and 100 kVA, and output a voltage of approximately 240 Volts, or between 200 Volts and 280 Volts. In some embodiments, each of the buck converters may output approximately 230 Volts at 13.5 Amperes, or between 200 Volts and 250 Volts, and between 10 and 20 Amperes.

The energy sources 102 and 104 are connected or connectable to the converter circuitry 101 via connections. In particular, a connection 105 connects a positive terminal of the energy source 102 to a positive terminal of the converter 112 while a connection 107 connects a negative, ground or reference terminal of the energy source 102 to a negative terminal of the converter 112. Connections 109 and 111 connect terminals of the energy source 104 and the converter 114. Connections 115 and 117 connect terminals of the converter 112 and the converter 122. Connections 119 and 121 connect terminals of the converter 114 and the converter 124. Connections 129 and 131 connect terminals of the converter 124 and the converter 132. Connections 125 and 127 connect terminals of the converter 122 and the converter 132. Connections 126 and 133 connect terminals of the converter 122 and the converter 134. Connections 135 and 137 connect terminals of the converter 132 and the entity 142. Connections 139 and 141 connect terminals of the converter 134 and the entity 144. Although not specifically illustrated, connections may also connect terminals of the converter 122 and 124.

Figure 10A:
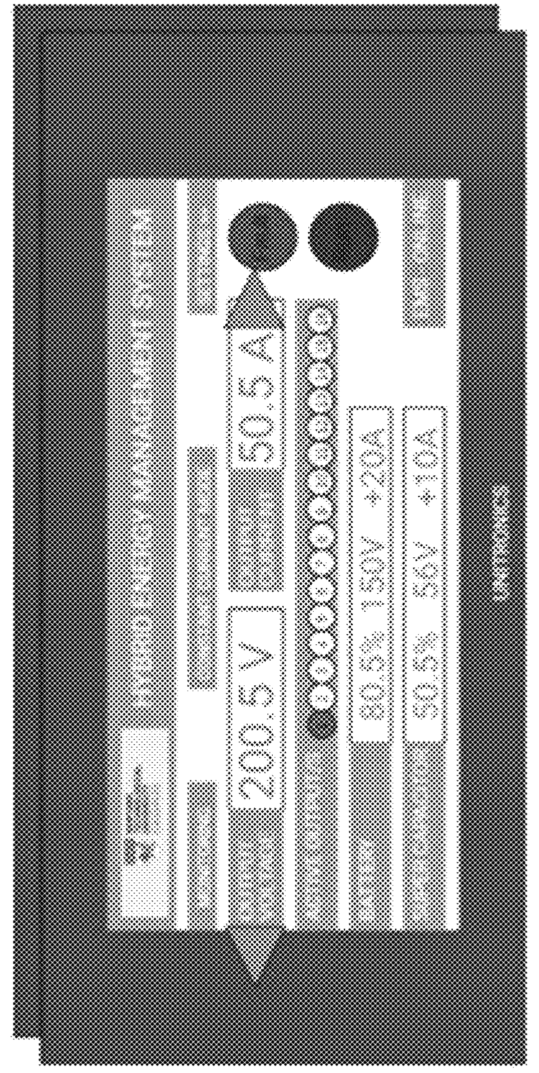
Figure 10A:
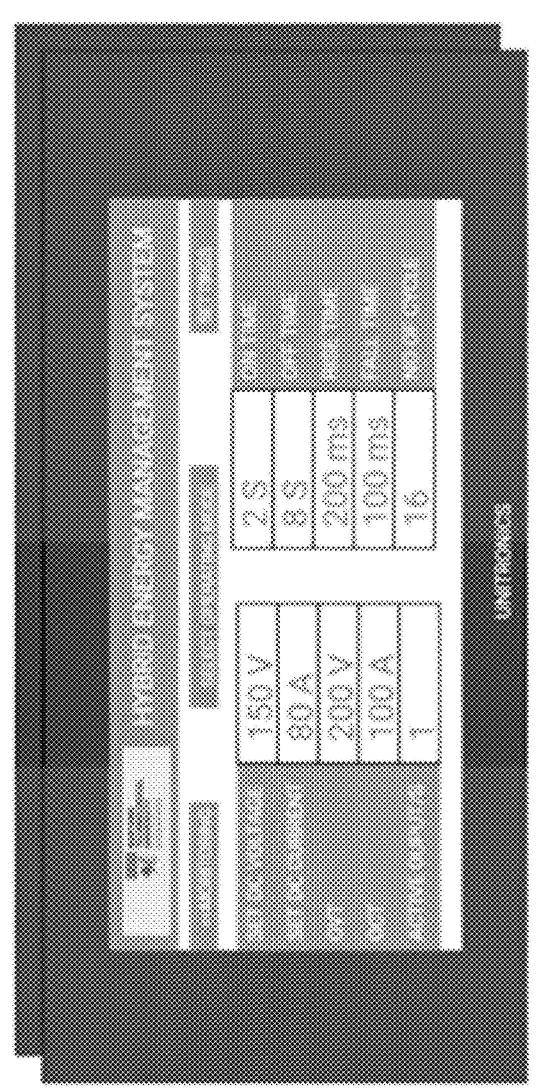
Figure 10A:
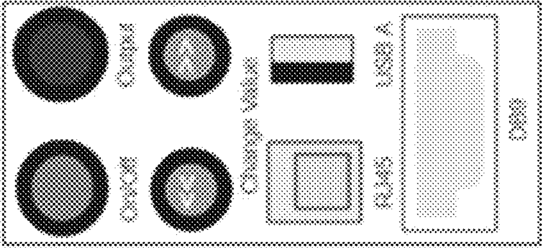
Figure 10A:
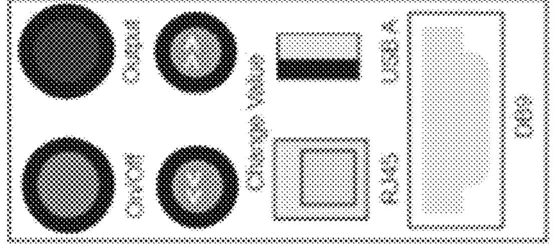

The controller 150 may include software, hardware, and/or firmware to control operations of the electric system 100, including controlling any or all of the energy sources 102 and 104, and the converter circuitry 101. In some embodiments, the controller 150 may include a dual-core microcontroller which supports communication protocols such as Controller Area Network (CAN) protocol and/or Serial Peripheral Interface (SPI). In some embodiments, the controller 150 may include one or more processors and instructions (e.g., which may include parameters, expressions, protocols, evaluations, conditions, arguments, and/or functions) to implement the control of the operations. In some embodiments, the controller 150 may be powered by an auxiliary power source, such as a 24 Volt power supply. These operations may include receiving a demand for energy from the entities 142 and/or 144. The demand for energy may indicate or be associated with one or more entity characteristics such as type of the entities 142 and 144, and one or more energy characteristics of the energy to be distributed. The characteristics may indicate a particular pulsed current profile. Attributes of the particular pulsed current profile may include, without limitation, a duration of a pulse, a rise time, a fall time, a peak pulsed current value, a duty cycle, an OFF time, an ON time, a shape of a pulse, a degree of urgency for the distribution of the energy, and/or a time window for the energy to be distributed. In some embodiments, the entity characteristics and the energy characteristics may be obtained from an interface, such as a human machine interface (HMI). In some embodiments, the HMI may be integrated or otherwise associated with the controller 150. An example of an HMI at which entity characteristics and/or energy characteristics are inputted is shown in FIG. 10A. Example parameters of the controller 150 are shown in Table 3 below.

TABLE 3

Specifications of a controller (e.g., the controller 150), in conjunction with an associated HMI, are shown.

| Parameter | Description | | | | | |
|---|---|---|---|---|---|---|
| Input Voltage | 24VDC | | | | | |
| Connector type | 2 optional inputs from Converter & BMS (Mezzanine and BMS 24DC) 1 output for HMI( ) | | | | | |
| Max Current | Less than 1A | | | | | |
| Isolation | External isolated aux power supply | | | | | |
| Control board | Texas Instruments Microcontroller: F28379D Delfino | | | | | |
| HMI | Unistream 5" HMI: US5-B5-B1 | | | | | |
| HMI dimension | 161.3 mm × 106.3 mm × 2.165 mm (W × H × D) | | | | | |
| Control board dimensions | 200 mm × 80 mm | | | | | |
| Weight | HMI = 334 g; | | | | | |
| Pollution Degree | HMI: Relative humidity: 5% to 95% (non-condensing) | | | | | |
| Protection | HMI: Front face: IP66, Rear side: IP20 | | | | | |
| Operating Temp | HMI: −20° C. to 55° C. | | | | | |
| Storage Temperature | HMI: −30° C. to 70° C. | | | | | |
| Operating Altitude | HMI: 2000 m | | | | | |
| Shock | HMI: IEC 60068-2-27, 15G, 11 ms duration | | | | | |
| Vibration | HMI: IEC 60068-2-6, 5 Hz to 8.4 Hz, 3.5 mm constant amplitude, 8.4 Hz to 150 Hz, 1G | | | | | |
| Remote Control | Yes | | | | | |
| Communication | HMI | BMS | B/UMS | HOST PC | CONVERTER | EXTERNAL |
| Number of Ports | 1 | 1 | 1 | 2 | 1 | 1 |
| Mode | CAN, 24DC_O | CAN | CAN | Eth & USB | DIO, 24DC_I | CAN, DO |
| Connector type | Internal-term | D50 SUB | D50 SUB | RJ45 & USB A | D50 SUB | D9 SUB |

The controller 150 may determine an amount of energy to draw from each of the energy sources 102 and 104. This determination may be based on the entity characteristics, the energy characteristics, statuses of the energy sources 102 and 104, and/or a configuration or topology of the electric system 100. The controller 150 may determine to draw the energy only from a single energy source or from both of the energy sources 102 and 104. If the controller 150 determines to draw the energy from both of the energy sources 102 and 104, the controller 150 may determine a proportion of energy to draw from each of the energy sources 102 and 104. The statuses of the energy sources 102 and 104 may encompass an amount of available energy in each of the energy sources 102 and 104, and instantaneous, historical, predicted, or scheduled future demands on the available energy in each of the energy sources 102 and 104. For example, if the energy source 102 currently has sufficient available energy but the available energy is scheduled for distribution to a different entity, or predicted to be scheduled for distribution, the controller 150 may be less likely to draw energy from the energy source 102. In other embodiments, the controller 150 may determine which of, and how much energy to draw from, the energy sources 102 and 104 based on the energy characteristics requested by the entities 142 and/or 144. For example, if the entities 142 and/or 144 request pulses of a specific shape, the controller 150 may be more likely to select whichever of the energy sources 102 and 104 is capable or configured to output pulses having a shape closer to the requested shape. Starting with pulses closer to the requested shape would decrease an amount of transformation to be applied to the pulses before distribution to the entities 142 and/or 144. As another example, if the entities 142 and/or 144 demand energy to be distributed within a specific timing window, the controller 150 may be more likely to select whichever of the energy sources 102 and 104 is predicted to have more availability of energy within the specific timing window. In some embodiments, the controller 150 may, as soon as the demand for energy has been fulfilled, configure circuitry within the electric system 100 to terminate distribution of energy and charge any of the energy sources 102 and/or 104 during a time period at which no energy is being drawn from the energy sources 102 or 104.

The controller 150 may control components of the electric system 100, such as the converters 132 and/or 134, to transform the energy into a form consistent and/or compatible with the entity characteristics and the energy characteristics. For example, if the energy characteristics requested by the entities 142 and/or 144 indicate a range of acceptable characteristics or a discrete number of acceptable characteristics, the controller 150 may control circuitry within the electric system 100, such as circuitry within the converters 132 and/or 134, to perform the transformation of the energy to be within the acceptable characteristics. The controller 150 may also control a timing of the distribution of pulses. For example, if the entities 142 and/or 144 request the distribution of pulses within a specific time window, the controller 150 may schedule distribution of pulses to occur within the specific time window, to prevent premature or delayed distribution.

The controller 150 may detect any problem conditions such as decreased or compromised performance, faults, and/or irregularities within the electric system 100. The detection of problem conditions may include detecting one or more parameters or attributes that are outside of permitted ranges. In some embodiments, the controller 150 may detect specific problem conditions within the converter circuitry 101, such as anomalous waveforms, semiconductor device failure, or gate drive circuit failure. In some embodiments, the controller 150 may detect problem conditions within the energy sources 102 and 104, such as, if an available amount of energy is less than a threshold amount.

Upon detection of any problem conditions, the controller 150 may respond to the problem conditions by initiating an auxiliary process (e.g., a different converter or energy source), and/or addressing the problem condition at the specific component affected by the problem condition. In some embodiments, the controller 150 may generate an alert regarding the problem condition.

In some embodiments, if the controller 150 detects that available energy within the energy source 104 falls under the threshold amount, the controller 150 may initiate a charging process to charge the energy source 104. This charging may be provided by the energy source 102 or a different energy source, depending on an amount of excess availability of energy of the other energy source 102 or a different energy source. In order to initiate the charging of the energy source 104, the controller 150 may activate circuitry within the energy source 102, within the converter 112, the converter 122, the converter 124, the converter 114, and/or the energy source 104, in order to permit energy from the energy 102 to become discharged and distributed across the converter 112, the converter 122, the converter 124, and/or the converter 114.

The controller 150 may detect problem conditions via communications with any components within the electric system 100. The communications may be established via connections between the controller and various interfaces. In FIG. 1, the controller 150 may transmit and receive communications and/or commands (hereinafter "communications") from the energy sources 102 and 104, the converters 112, 114, 122, 124, 132, and 134, and the entities 142 and 144, via one or more interfaces 152, 154, 162, 164, 172, 174, 182, 184, 192, and 194, respectively. In some examples, the interfaces 152, 154, 162, 164, 172, 174, 182, 184, 192, and 194 may constitute circuit interfaces and/or client interfaces. In FIG. 1, for the sake of illustration, the interface 152 may receive and transmit communications between the controller 150 and the energy source 102. The interface 154 may receive and transmit communications between the controller 150 and the energy source 104. The interface 162 may receive and transmit communications between the controller 150 and the converter 112. The interface 164 may receive and transmit communications between the controller 150 and the converter 114. The interface 172 may receive and transmit communications between the controller 150 and the converter 122. The interface 174 may receive and transmit communications between the controller 150 and the converter 124. The interface 182 may receive and transmit communications between the controller 150 and the converter 132. The interface 184 may receive and transmit communications between the controller 150 and the converter 134. The interface 192 may receive and transmit communications between the controller 150 and the entity 142. The interface 194 may receive and transmit communications between the controller 150 and the entity 144.

The controller 150 may connect to the interfaces 152, 154, 162, 164, 172, 174, 182, 184, 192, and 194 via a network 151. The network 151 may include any secured communication network such as an encrypted network. The network 151 may represent one or more computer networks (e.g., LAN, WAN, or the like) or other transmission mediums. The network 151 may provide communication within the electric system 100 and/or between the electric system 100 and other external systems or infrastructures. In some embodiments, the network 151 includes one or more computing devices, routers, cables, buses, and/or other network topologies (e.g., mesh, and the like). In some embodiments, the network 151 may be wired and/or wireless. In various embodiments, the network 151 may include the Internet, one or more wide area networks (WANs) or local area networks (LANs), one or more networks that may be public, private, IP-based, non-IP based, and so forth.

Other configurations that include different numbers and/or arrangements of interfaces are also contemplated. For example, the controller 150 may alternatively communicate with a single interface that may be connected to all energy sources, multiple energy sources, all converters, multiple converters, and/or all components within the electric system 100.

In some examples, the interfaces 152, 154, 162, 164, 172, 174, 182, 184, 192, and 194 may constitute circuit interfaces and/or client interfaces. The interfaces 152, 154, 162, 164, 172, 174, 182, 184, 192, and 194 may decipher, convert, and/or translate (hereinafter "translate") any commands from the controller 150 into actions, such as changes in circuitry and/or programming. The interfaces 152, 154, 162, 164, 172, 174, 182, 184, 192, and 194 may also obtain data, such as operational parameters and attributes (e.g., electrical parameters such as voltages or indicators of signal or transmission quality), and/or any results of an action (e.g., whether an action successfully addressed a fault) within any of the components within the electric system 100. The interfaces 152, 154, 162, 164, 172, 174, 182, 184, 192, and 194 may transmit any data obtained to the controller 150. The controller 150 may, in turn, store the data within one or more datastores.

In some examples, the interfaces 152, 154, 162, 164, 172, 174, 182, 184, 192, and 194 may include or be associated with graphical user interfaces and/or web-based interfaces to enable access to any data obtained and/or communications and/or to permit configuration or management of the controller 150 and/or other aspects of the electric system 100. The interfaces 152, 154, 162, 164, 172, 174, 182, 184, 192, and 194 may support load balancing during any concurrent requests for access.

In some embodiments, the controller 150 and any or all of the interfaces 152, 154, 162, 164, 172, 174, 182, 184, 192, and 194 may be combined together to form a controller system.

Figure 2:
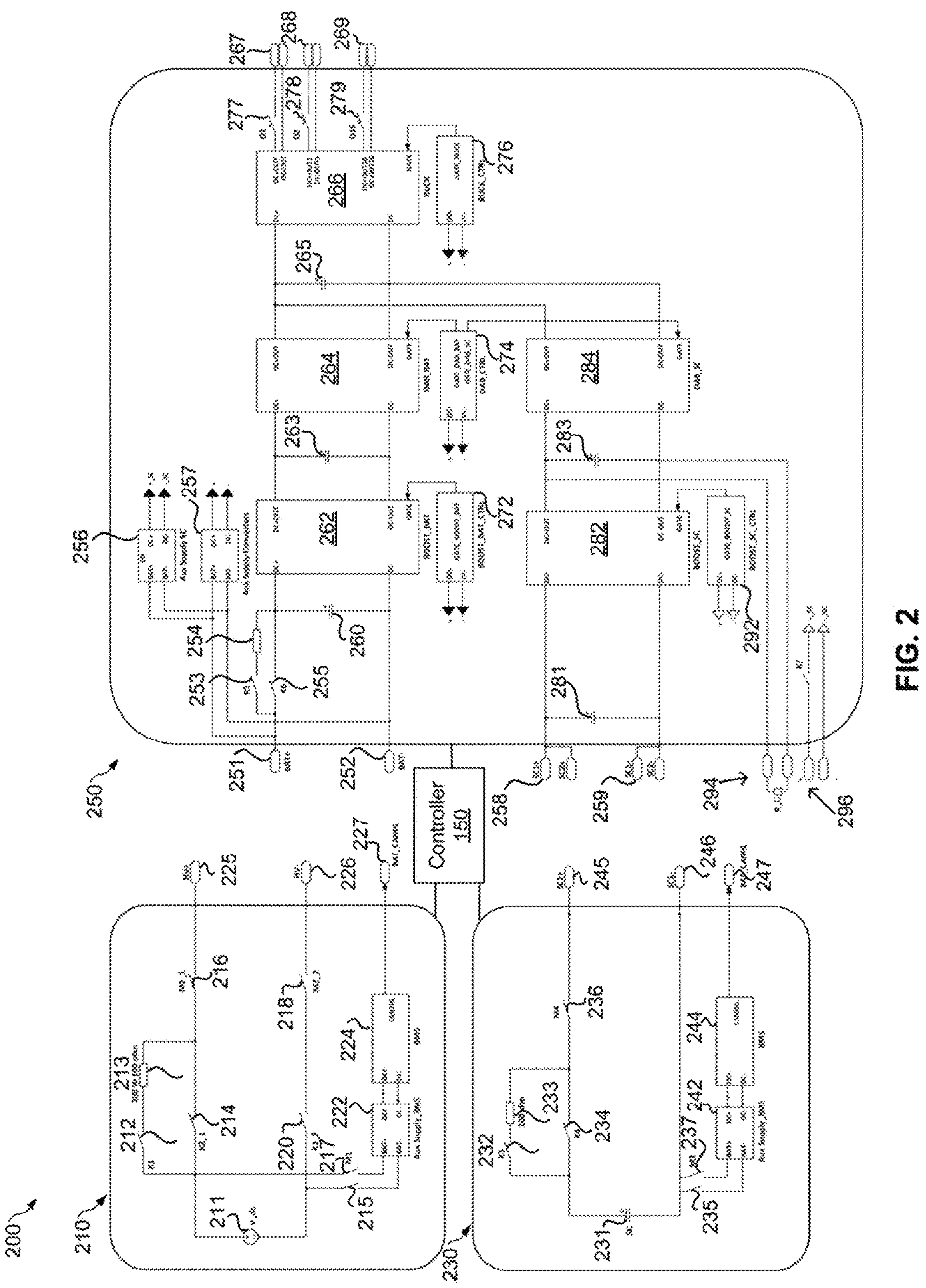
FIG. 2 is a diagram of an electric system that stores and distributes electric energy to one or more entities, according to some embodiments of the present invention.

FIG. 2 illustrates a diagram of an electric system 200. Any principles described in FIG. 1 may also be applicable to FIG. 2, and vice versa. FIG. 2 illustrates circuit connections between components and circuit features of components of the electric system 200, such as a precharge circuit to mitigate or avoid inrush of current, and configuration of input and output capacitors of each of the converters. The components in FIG. 2 include an energy source 210, an energy source 230, and converter circuitry 250, which may be connected or connectable in a modular fashion.

The energy source 210 may be implemented as the energy source 102 of FIG. 1. The energy source 230 may be implemented as the energy source 104 of FIG. 1. The converter circuitry 250 may be implemented as the converter circuitry 101 of FIG. 1. The energy source 210 may include one or more batteries. Circuitry of the energy source 210 includes a voltage source 211 which may be a direct current (DC) source, a switch 212 in series with a resistor 213, a switch 214 in a parallel, lower resistance flow path with the switch 212, and a switch 216. In some embodiments, the switch 216 may be a manually controlled switch. The switches 212, 214, and 216 may be disposed within one or more energy flow paths between the voltage source 211 and a positive terminal 225 of the energy source 210. The positive terminal 225 of the energy source 210 may be connected to a positive terminal 251 of the converter circuitry 250. The energy source 210 may include switches 218 and 220 disposed within a path between the voltage source 211 and a negative terminal 226 of the energy source 210. In some embodiments, the switches 214, 216, 218, and/or 220 may be closed together or simultaneously, for example, by the controller 150. Therefore, energy may flow through the path between the voltage source 211 and the positive terminal 251, as well as the path between the negative terminal 226 and the voltage source 211. The energy source 210 may further include or be associated with one or more management systems, such as an energy source management system 224 and an auxiliary supply management system 222. The energy source management system 224 and the auxiliary supply management system 222 may be implemented as part of the controller 150 in some embodiments. In other embodiments, the energy source management system 224 and the auxiliary supply management system 222 may be separate from the controller 150 and may communicate with the controller 150. Specifically, the energy source management system 224 and the auxiliary supply management system 222 may control operations of one or more energy components and/or auxiliary energy components within the energy source 210, while monitoring for problem conditions within the energy source 210 and responding to the problem conditions. The energy source management system 224 and the auxiliary supply management system 222 may be connected to a terminal 227 that communicates with other components of the electric system 200, via one or more communication protocols such as CAN and SPI. In some embodiments, the energy source management system 224 may have one or more CAN 2.0B transceivers and one or more 4-wire SPI interfaces. The energy source management system 224 and the auxiliary supply management system 222 disposed within a path between the terminal 227 and one or more switches 215 and 217. When the switches 215 and 217 are closed, the energy source management system 224 and the auxiliary supply management system 222 may be connected to other components within the energy source 210.

The energy source 230 may be implemented in a similar manner as previously described for energy source 210, except that the voltage source 211 is replaced by a capacitor 231, such as a supercapacitor, and the switches 220 and 218 are omitted. Circuitry of the energy source 230 includes the capacitor 231, a switch 232 in series with a resistor 233, a switch 234 in a parallel, lower resistance flow path with the switch 232, and a switch 236. In some embodiments, the switch 236 may be a manually controlled switch. The switches 232, 234, and 236 may be disposed within one or more energy flow paths between the capacitor 231 and a positive terminal 245 of the energy source 230. The positive terminal 245 of the energy source 230 may be connected to a positive terminal 258 of the converter circuitry 250. The energy source 210 may further include one or more management systems, such as an energy source management system 244 and an auxiliary supply management system 242. The energy source management system 244 and the auxiliary supply management system 242 may be implemented as part of the controller 150. Specifically, the energy source management system 244 and the auxiliary supply management system 242 may control operations of one or more energy components and/or auxiliary energy components within the energy source 230, while monitoring for problem conditions within the energy source 230 and responding to the problem conditions. The energy source management system 244 and the auxiliary supply management system 242 may be connected to a terminal 247 that communicates with other components of the electric system 100 via one or more protocols such as a Controller Area Network (CAN) protocol. The energy source management system 244 and the auxiliary supply management system 242 disposed within a path between the terminal 247 and one or more switches 235 and 237. When the switches 235 and 237 are closed, the energy source management system 244 and the auxiliary supply management system 242 may be connected to other components within the energy source 230.

In some embodiments, the controller 150 may be implemented as part of the converter circuitry 250. In other embodiments, the converter circuitry 250 may be separate from the controller 150 and communicate with the controller 150. The converter circuitry 250 may include the positive terminal 251 which connects to the positive terminal 225 of the energy source 210, a negative terminal 252 which connects to a negative terminal 226 of the energy source 210, the positive terminal 258 which connects to the positive terminal 245 of the energy source 230, and a negative terminal 259 which connects to a negative terminal 246 of the energy source 230. The converter circuitry 250 may include one or more additional terminals 296 to connect the energy source management system 244 to an energy source.

The converter circuitry 250 may include converters 262, 282, 264, 284, and 266, which may be implemented as the converters 112, 114, 122, 124, and 132 of FIG. 1, respectively. The converter circuitry 250 may include one or more auxiliary energy sources 256 and 257 which may supply energy to control cards. In some embodiments, the control cards include the controller 150. In some embodiments, the control cards include any of drivers 272, 274, 276, and/or 292. The control cards may transmit pulsing information, including pulses, to control the turning ON of the converters 262, 264, 266, 282, and/or 284. Examples of control card implementations are shown below in Tables 4 and 5.

At an output side of the converter 266, switches 277, 278, and 279 may control distribution of energy to entities 267, 268, and 269, respectively. Although three entities are illustrated as connected to the converter 266, any number of entities, such as 4, 8, 16, or 32 entities, may be connected to the converter 266. The controller 150 may control the distribution of energy to each of the entities 267, 268, and 269 by regulating an ON or OFF switching of the switches 277, 278, and 279. In particular, when energy is being distributed to the entity 267, in response to a demand from the entity 267, the controller 150 may transition the switch 277 to an ON or closed state. At other times, when energy is not being distributed to the entity 267, the controller may maintain the switch 277 in an OFF state. When energy is being distributed to the entity 268, in response to a demand from the entity 268, the controller 150 may transition the switch 278 to an ON or closed state. At other times, when energy is not being distributed to the entity 268, the controller may maintain the switch 278 in an OFF state. When energy is being distributed to the entity 269, in response to a demand from the entity 269, the controller 150 may transition the switch 279 to an ON or closed state. At other times, when energy is not being distributed to the entity 269, the controller may maintain the switch 279 in an OFF state.

Further included within the converter circuitry 250 are capacitors 260, 281, 263, 283, and 265. The capacitors 260 and 281 may be input capacitors that provide a bypass path to stabilize ripple voltage amplitude at an input of the converter circuitry 250. The capacitor 263 may be an output capacitor of the converter 262 to stabilize an output voltage from the converter 262. The capacitor 283 may be an output capacitor of the converter 282 to stabilize an output voltage from the converter 282. The capacitor 283 may further be connected in series to auxiliary circuitry 294 for discharging of the energy source 230, as a safety mechanism. The capacitor 265 may be an output capacitor of the converter 264 and of the converter 284 to stabilize an output voltage from either of the converters 264 and 284. The converter circuitry 250 may also include the driver 272 of the converter 262, the driver 274 of the converter 264 and of the converter 284, the driver 292 of the converter 282, and the driver 276 of the converter 266. Each of the drivers 272, 274, 292, and 276 may operate to switch on a corresponding converter by applying at least a threshold voltage (e.g., a gate voltage) to the corresponding converter. For example, the driver 272 may control switching ON of the converter 262. The driver 274 may control switching ON of the converters 264 and/or 284. The driver 276 may control switching ON of the converter 276. The driver 292 may control switching ON of the converter 282.

The converter circuitry 250, in addition to the energy sources 210 and 230, may include circuitry that mitigates a possibility of an inrush of current when the energy sources 210 and 230 are connected to the converter circuitry 250. The converter circuitry 250 may include a switch 253 in series with a resistor 254 and with the capacitor 260. This path of the converter circuitry 250 slows down a charging of the capacitor 260 when the energy source 210 is connected. Upon connection of the energy source 210 to the converter circuitry 250, the controller 150, or the energy source management system 224, may cause the switch 212 to be closed and cause the switch 214 to be opened so that current flows through a more resistive path through the switch 212 and the resistor 213. In addition, the controller 150 may cause the switch 253 to be closed while causing the switch 255 to be opened so that the current from the energy source 210 flows through a more resistive path and slowly charges the capacitor 260. Once the capacitor 260 has been charged to a threshold capacitance, the capacitor is able to reduce ripple voltage amplitude at an input of the converter circuitry 250. At that point, the controller 150 may open the switches 212 and 253 while closing the switch 255 to permit current to flow through a less resistive path from the energy source 210 towards the converter 262. During this process, the switch 216 may remain closed without control by the controller 150.

The energy source 230 operates in a similar manner to reduce a possibility of an inrush of current from the energy source 230 into the converter circuitry 250. Upon connection of the energy source 230 to the converter circuitry 250, the controller 150, or the energy source management system 244, may cause the switch 232 to be closed while causing the switch 234 to be opened in order to divert current into a more resistive path, and charge the capacitor 281 at a slower rate. Once the capacitor 281 reaches a threshold capacitance, the controller 150, or the energy source management system 244, may cause the switch 232 to be opened while causing the switch 234 to be closed so that current flows from the energy source 230 to the converter circuitry 250 through a less resistive path.

In some embodiments, each of the converters 262, 282, 264, 284, and 266 may contain or be associated with a local controller that contains software, hardware, and/or firmware to control operations of a corresponding converter and communicates with the controller 150 via a CAN. For example, the local controllers corresponding to the converters 262 and/or 282 (e.g., boost controllers) may boost an output voltage to 170 Volts. The boost controllers may trigger a fault when an input voltage, output voltage, or total current exceeds respective threshold values. The boost controllers may transmit any fault status, input voltage, output voltage, output total current, and/or switching status of the converters 262 and/or 282 to the controller 150. The boost controllers may perform the aforementioned tasks upon request or at periodic intervals, such as 1 millisecond, 5 milliseconds, or 10 milliseconds. In some embodiments, any number of local controllers may be assigned to converters of a same type (e.g., boost converters, DABs, buck converters). For example, one single local controller, rather than two local controllers, may control the converters 262 and 282.

The local controller corresponding to the converters 264 and/or 284 (e.g., DAB controllers) may each include a voltage-controller, single-phase shift controller. A secondary side of the DAB controllers may charge during a pre-charging stage using an open loop DAB switching, then transitioning to closed-loop control for 260 Volts via a signal from the controller 150. The DAB controllers may utilize both CPUs for voltage control and for fan control. The local. The DAB controllers may transmit an input voltage, an output voltage, an output total current, and/or a switching status of the converters 264 and/or 284 to the controller 150. The DAB controllers may perform the aforementioned tasks upon request or at periodic intervals, such as 1 millisecond, 5 milliseconds, or 10 milliseconds.

The local controller corresponding to the converter 266 (e.g., buck controller) may generate current controlled output for configured output channels (e.g., the loads 267, 268, 269) with specified ON, OFF, rise, and fall timings. The buck controller may transmit an input voltage, an output voltage, an output total current, and/or a switching status of the converters 266 to the controller 150. The buck controller may perform the aforementioned tasks upon request or at periodic intervals, such as 1 millisecond, 5 milliseconds, or 10 milliseconds.

Figure 3A:
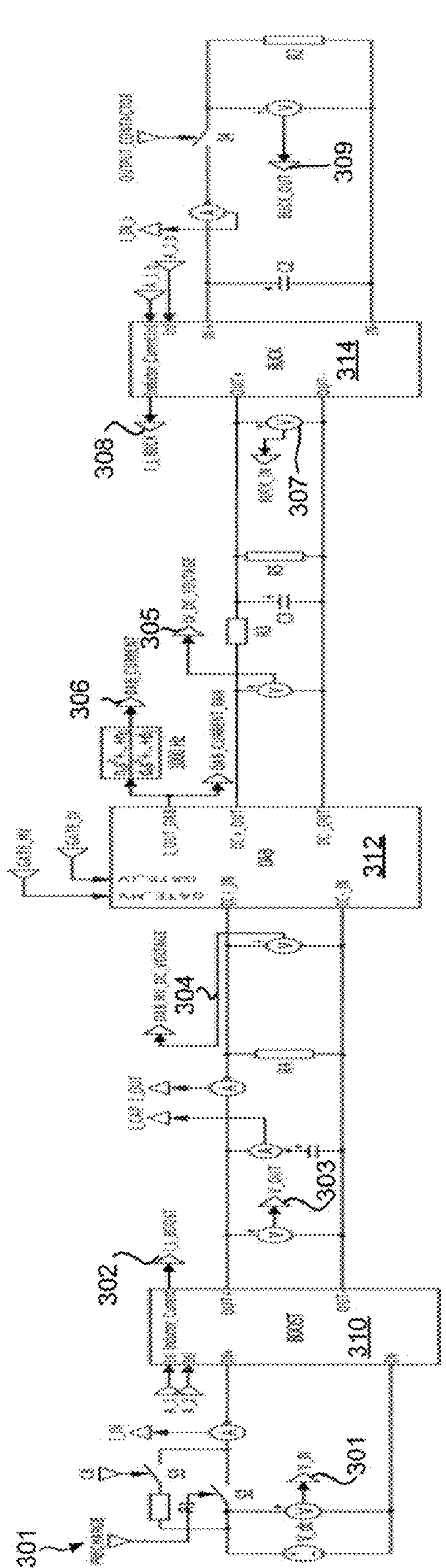
FIGS. 3A-3G are circuit diagrams of an electric system that stores and distributes electric energy to one or more entities, according to some embodiments of the present invention.

FIGS. 3A-3G illustrate example diagrams, consistent with FIGS. 1 and 2. FIG. 3A illustrates a circuit representation of an electric system 300. The implementation of the electric system 300 may be consistent with the electric system 200 and the electric system 100, as described in FIGS. 2 and 1. In FIG. 3A, a precharge circuit 301 includes a high resistance path that mitigates a possibility of an inrush of current. The precharge circuit 301 may be implemented in a same or similar manner as that described in FIG. 2. Following precharging, pulsed energy may be distributed through a low resistance path, sequentially through a boost converter 310, a DAB 312, and a buck converter 314. In some embodiments, the boost converter 310 may be implemented as the converter 112 or the converter 114 of FIG. 1, or as the converter 262 or the converter 282 of FIG. 2. In some embodiments, the DAB 312 may be implemented as the converter 122 or the converter 124 of FIG. 1, or as the converter 264 or the converter 284 of FIG. 2. In some embodiments, the buck converter 314 may be implemented as the converter 132 or the converter 134 of FIG. 1, or as the converter 266 of FIG. 2.

Between each converter are different circuit elements which further regulate amount of current passing through flow paths and/or provide backup flow paths. For example, a capacitive element may be provided at an output of the boost converter 310, at an output of the DAB 312, and at an output of the buck converter 314. In some embodiments, parasitic resistances may exist, for example, across positive and negative terminals of the boost converter 310, across positive and negative terminals of the DAB 312, across positive and negative terminals of the buck converter 314, and/or across a positive terminal between the DAB 314 and the buck converter 314. In some embodiments, voltmeters may be connected across positive and negative terminals at an input of the boost converter 310, an output of the boost converter 310, an input of the DAB 312, an output of the DAB 312, an input of the buck converter 314, and/or an output of the buck converter 314.

Certain parameters in FIG. 3A may be measured or sampled to be provided as inputs, or used to compute inputs, to microcontrollers of the boost converter 310, the DAB 312, or the buck converter 314. These parameters may include an input voltage 301 which is measured at an input of the boost converter 310, an output boost current 302 which is measured at an output of the boost converter 310, an output boost voltage 303 which is measured at an output of the boost converter 310, a medium DC voltage 304 measured at an input of the DAB 312, a low DC voltage 305 measured at an output of the DAB 312, an output DAB current 306 measured at an output of the DAB 312, an input buck voltage 307 measured at an input of the buck converter 314, an output buck current 308 measured at an output of the buck converter 314, and an output buck voltage 309 measured at an output of the buck converter 314. Some of the measured parameters may be processed by a zero-order hold (ZOH) and/or by a multiplexing function that enables replication of a same circuit in parallel (e.g., eight parallel boost converters) prior to being provided as inputs to a microcontroller.

Figure 3B:
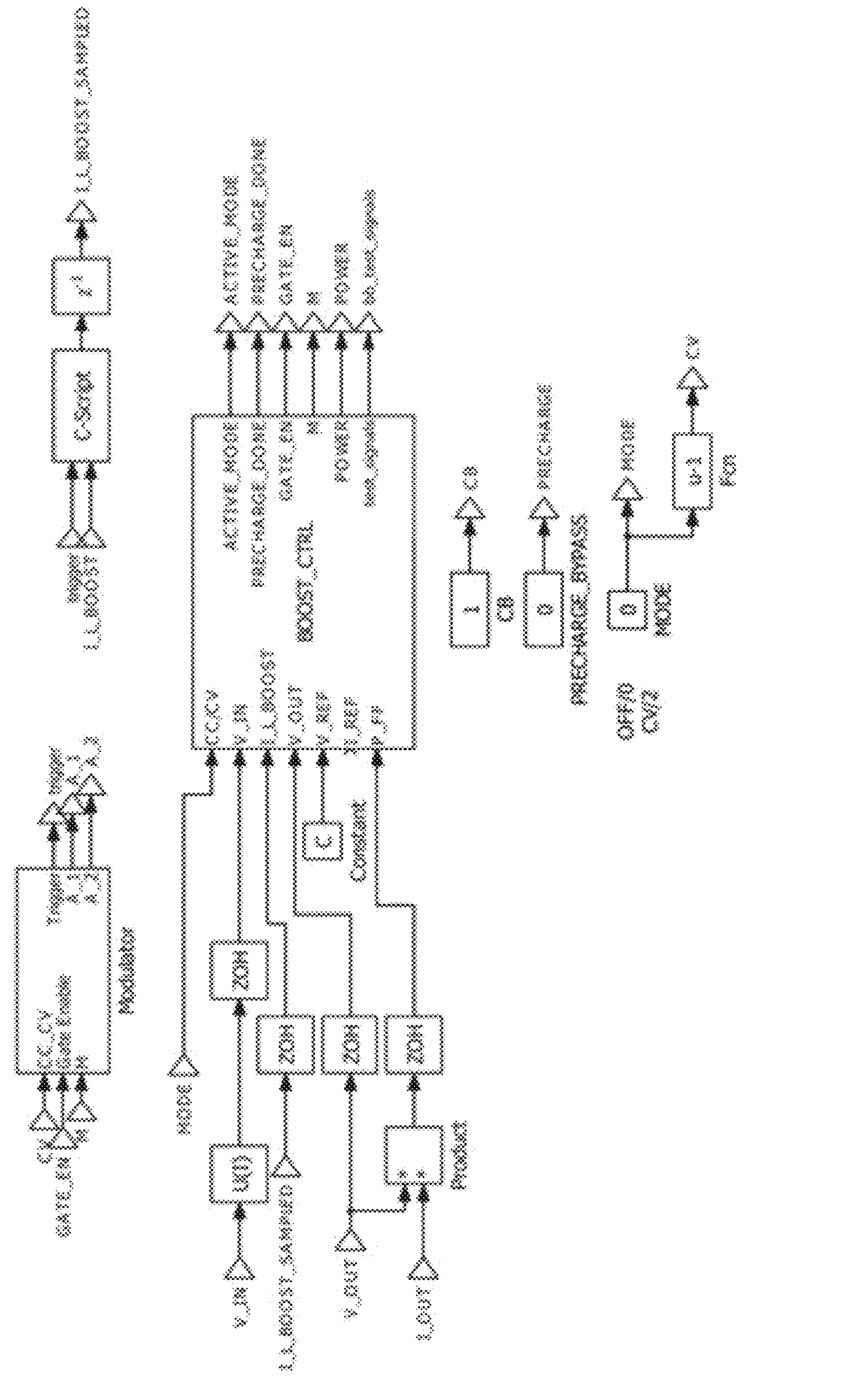

FIG. 3B illustrates a microcontroller 320 of the boost converter 310, consistent with the electric system 300 of FIG. 3A, the electric system 200 of FIG. 2, and the electric system 100 of FIG. 1. The microcontroller 320 includes an input, or input pin, of a constant current-constant voltage (CC-CV) charging mode, to program both the boost converter 310 and the buck converter 314. Initially, within the boost converter 310, the microcontroller 320 monitors only the initial charging current until voltage reaches a threshold voltage, during the precharging. Other inputs, or input pins, to the microcontroller 320 include the input voltage 301, the output boost current 302, the output boost voltage 303, a reference voltage, a reference current, and a power based on the output boost voltage 303. In some embodiments, the output boost current 302 may have been delayed by one sampling period to avoid an algebraic loop in simulation. Outputs, or output pins, of the microcontroller 320 include an active mode in which energy is being distributed to or from the energy sources through the boost converter 310, a confirmation that precharging has been completed, an enable mode which permits input pulses to pass from an input to an output of a gate of the boost converter 310, a duty ratio of the boost converter 310, and other internal state variables for debugging. The duty ratio may be a ratio of an ON time to a total time of pulses that are transmitted to switches (e.g., transistors or switches 354, 355 in FIG. 3E) of the boost converter 310.

Figure 3C:
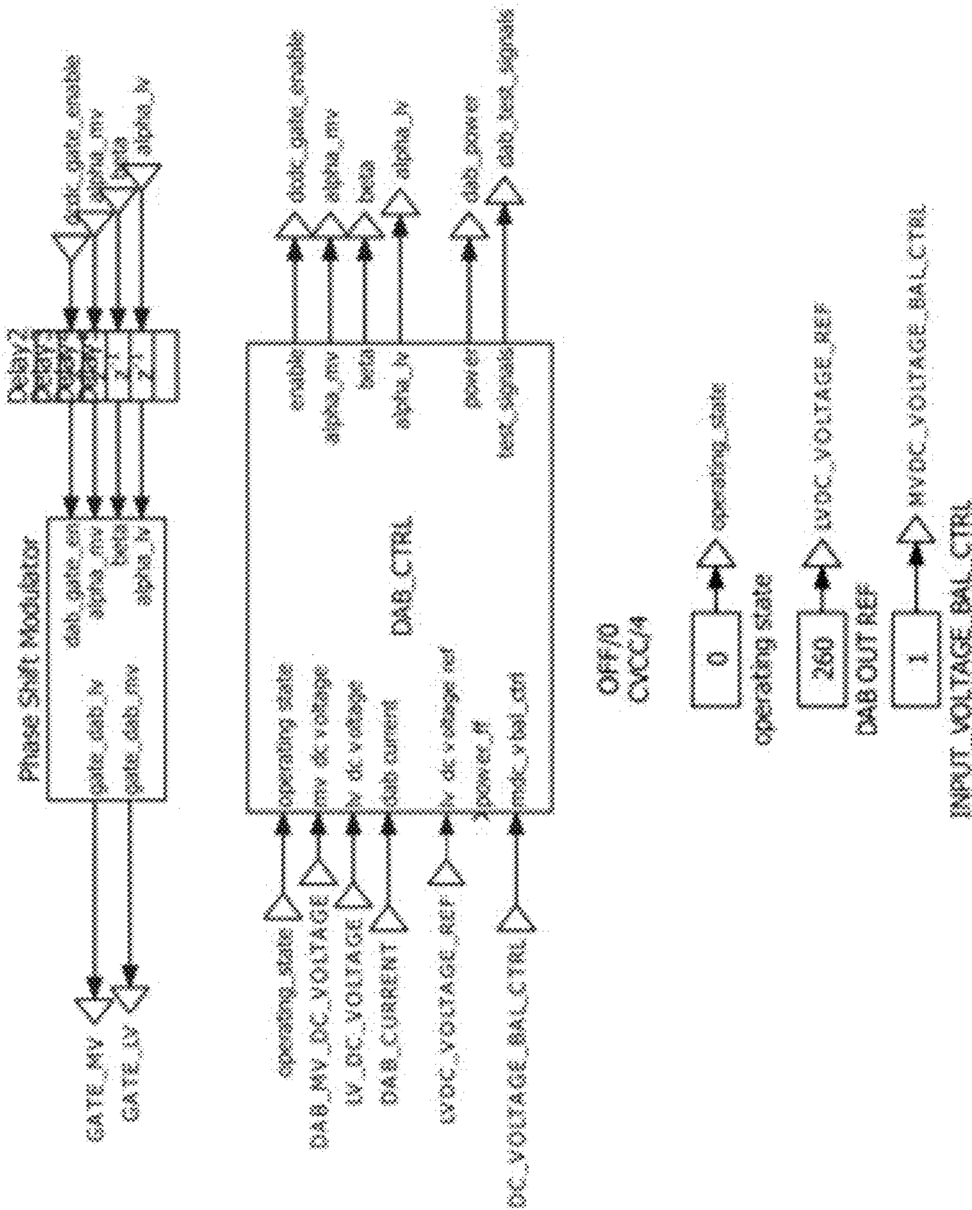

FIG. 3C illustrates a microcontroller 330 of the DAB 312, consistent with the electric system 300 of FIG. 3A, the electric system 200 of FIG. 2, and the electric system 100 of FIG. 1. The microcontroller 330 includes inputs of an operating state, the medium DC voltage 304, the low DC voltage 305, the output DAB current, a low DC voltage reference, and a medium DC voltage balance control. Outputs of the microcontroller 330 include an enable mode which permits input pulses to pass from an input to an output of a gate of the DAB 312 and various parameters related to a low-voltage gate, a medium-voltage gate, a power from the DAB 312, and parameters of triple phase shift control to regulate duty cycles of primary and secondary full-bridges of the DAB 312.

Figure 3D:
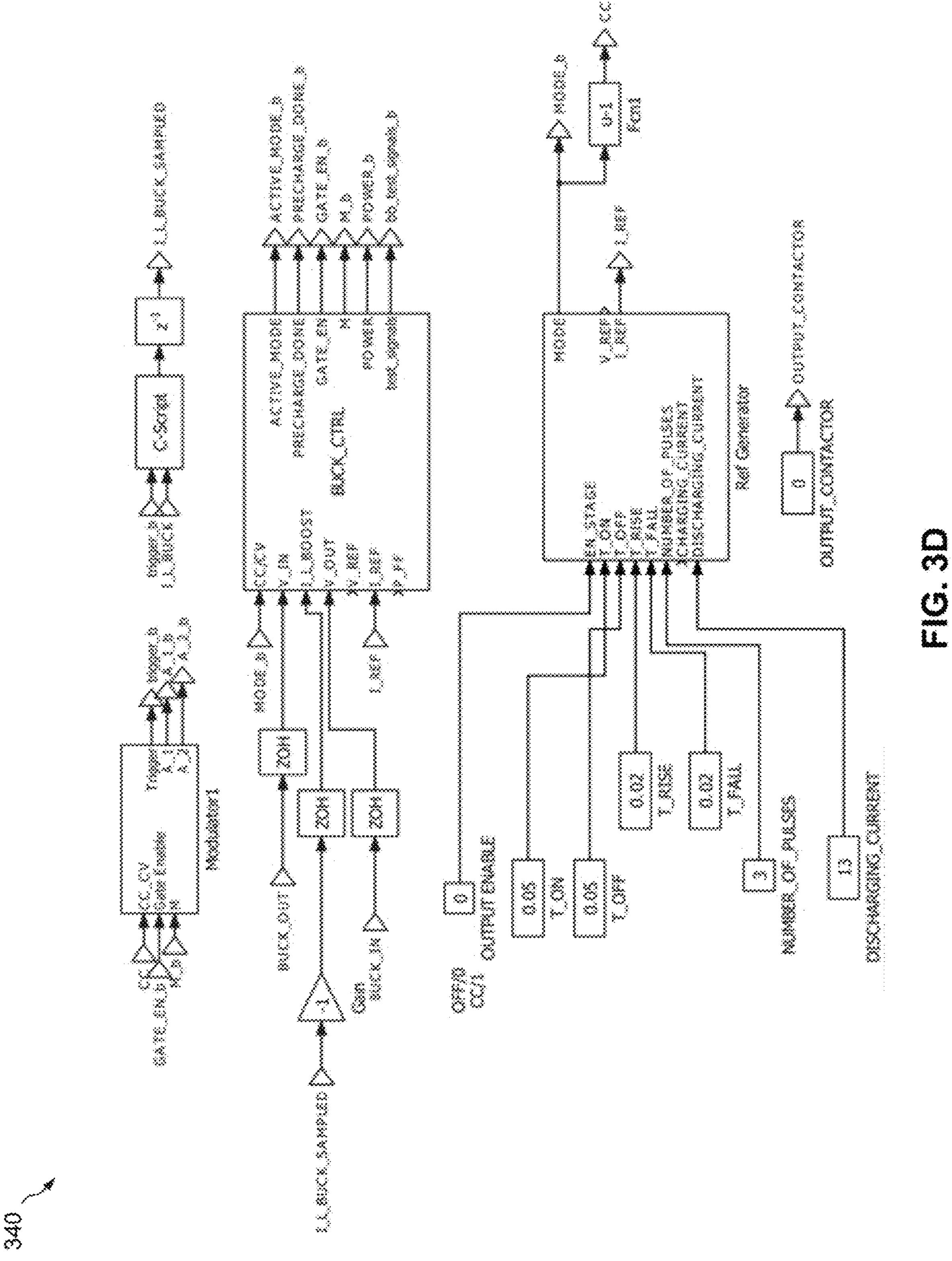

FIG. 3D illustrates a microcontroller 340 of the buck converter 314, consistent with the electric system 300 of FIG. 3A, the electric system 200 of FIG. 2, and/or the electric system 100 of FIG. 1. The microcontroller 340 includes an input of a CC-CV charging mode in which the buck converter 314 is initially charged at constant current until voltage reaches a threshold voltage, at which time the energy sources are charged at a constant voltage to prevent overvoltage. The microcontroller 340 further includes inputs such as the input buck voltage 307, the output buck current 308, the output buck voltage 309, a voltage reference, a current reference, and a power. The microcontroller 340 includes outputs of an active mode in which energy is being distributed to or from the energy sources through the buck converter 314, a confirmation that precharging has been completed, and an enable mode which permits input pulses to pass from an input to an output of a gate of the buck converter 314.

In FIG. 3D, an example of a programming of the buck converter 314 to generate a specific pulse profile is also illustrated. In FIG. 3D, the buck converter 314 may be programmed, by the controller 150, to generate a pulse having an ON time of 0.05 seconds, an OFF time of 0.05 seconds, a rise time of 0.02 seconds, a fall time of 0.02 seconds, and three pulses.

Figure 3E:
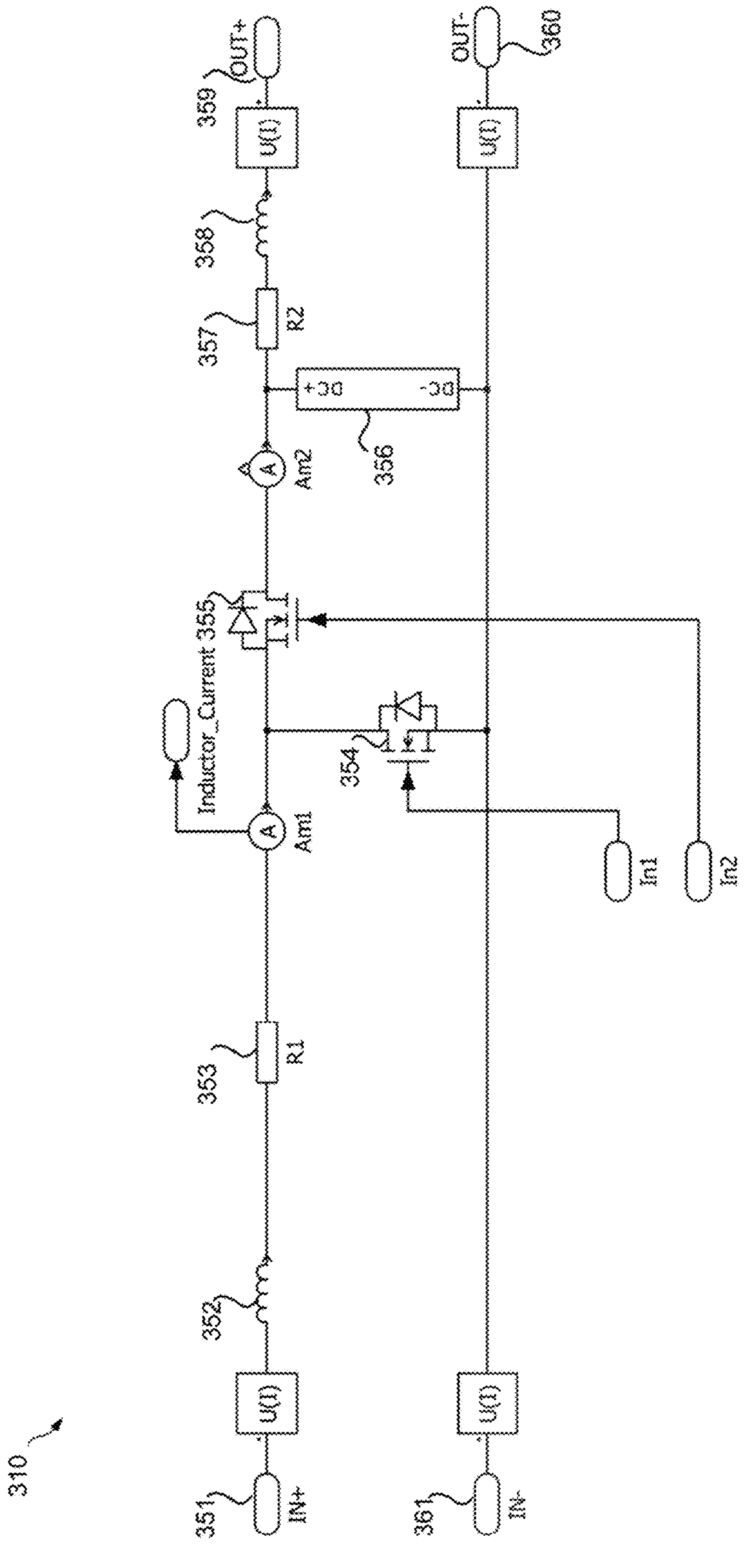

FIG. 3E illustrates a circuit representation of the boost converter 310, consistent with the electric system 300 of FIG. 3A, the electric system 200 of FIG. 2, and/or the electric system 100 of FIG. 1. The boost converter 310 includes circuit elements such as an inductor 352 and a resistor 353 connected to a positive input terminal 351 of the boost converter 310. A transistor or switch 354 is connected across the positive input terminal 351 and a negative input terminal 361 of the boost converter 310. A transistor or switch 355 is connected to the positive input terminal 351. A capacitor 356 is connected across a positive output terminal 359 and a negative output terminal 360. A resistor 357 and an inductor 358 are connected to the positive output terminal 359.

Figure 3F:
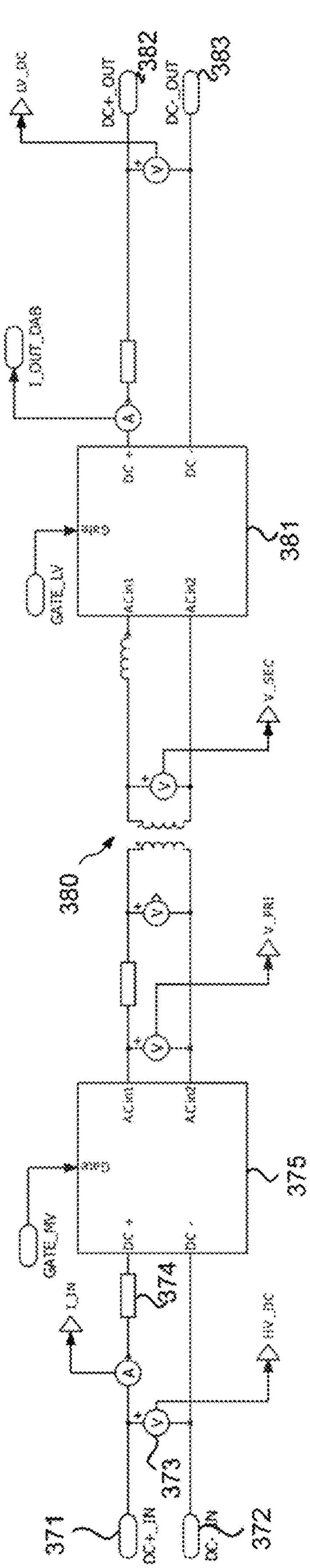
Figure 3F:

FIG. 3F illustrates a circuit representation of the DAB 312, consistent with the electric system 300 of FIG. 3A, the electric system 200 of FIG. 2, and/or the electric system 100 of FIG. 1. The DAB 312 includes a voltmeter 373 connected across a positive input terminal 371 and a negative input terminal 372. The DAB 312 includes a resistor 374 at a positive input terminal of a primary-side driver 375. The primary-side driver 375 is enabled by activating gate pulses from the controller 330 across a gate of the primary-side driver 375. The DAB 312 further includes a transformer 380 connecting the primary-side driver 375 to a secondary-side driver 381. The secondary-side driver 381 is enabled by activating gate pulses from the controller 330 across a gate of the secondary-side driver 381. An output of a secondary side of the DAB 312 is connected to a positive output terminal 382 and a negative output terminal 383 of the DAB 312.

Figure 3G:
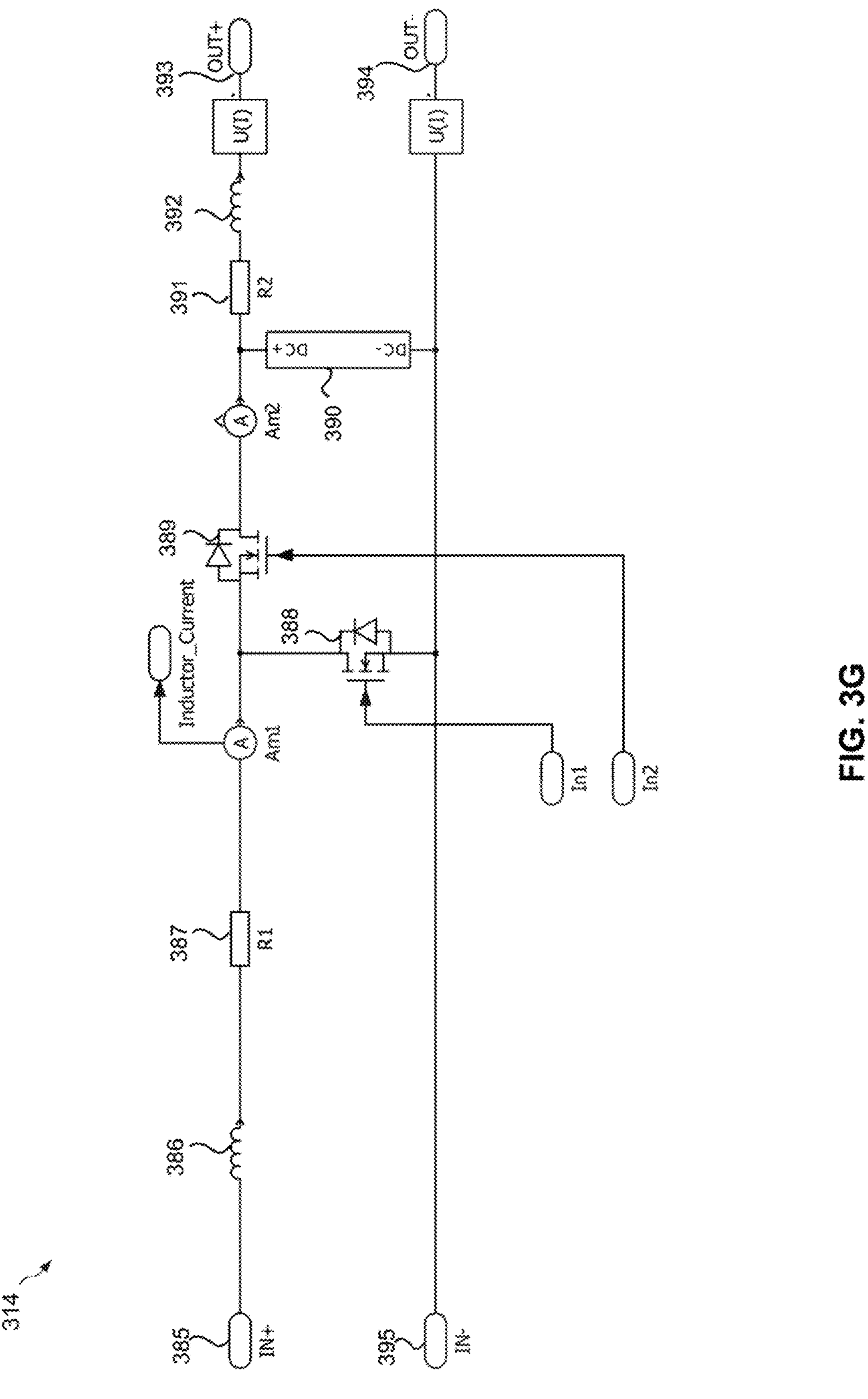

FIG. 3G illustrates a circuit representation of the buck converter 314, consistent with the electric system 300 of FIG. 3A, the electric system 200 of FIG. 2, and/or the electric system 100 of FIG. 1. The buck converter 314 includes circuit elements such as an inductor 386 and a resistor 387 connected to a positive input terminal 385 of the buck converter 314. A transistor 388 is connected across the positive input terminal 385 and a negative input terminal 395 of the buck converter 314. A transistor 389 is connected to the positive input terminal 385. A capacitor 390 is connected across a positive output terminal 393 and a negative output terminal 394. A resistor 391 and an inductor 392 are connected to the positive output terminal 393.

Figure 4:
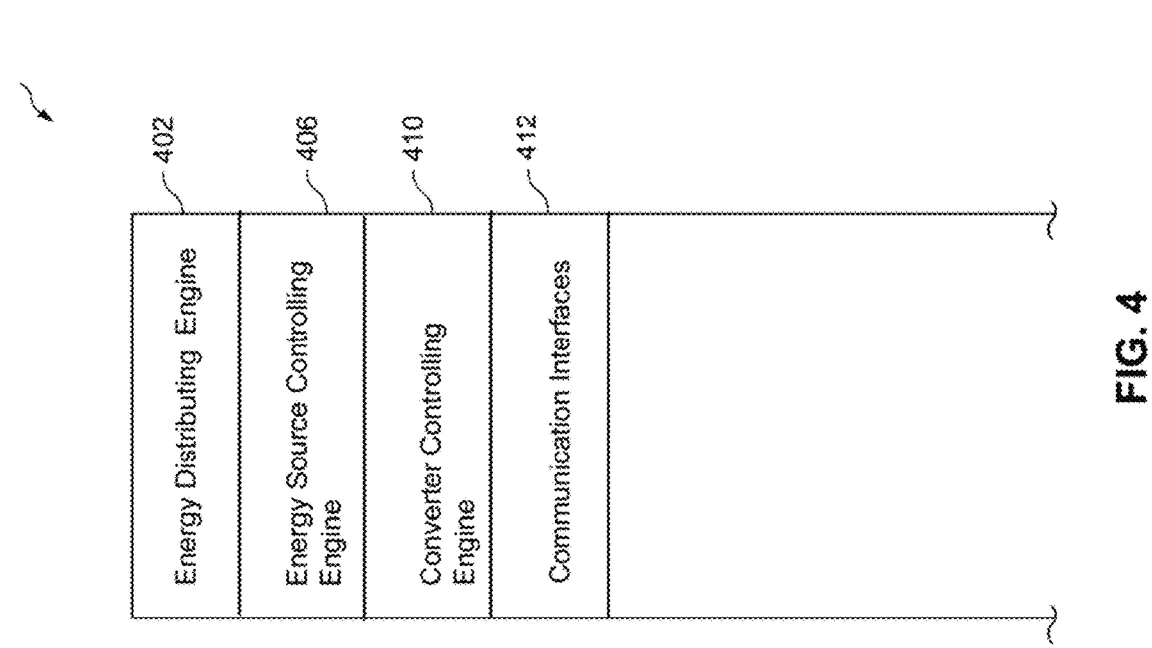
FIG. 4 is a block diagram of a controller which controls operations of the electric system shown in FIGS. 1, 2, and/or 3A, according to some embodiments of the present invention.

FIG. 4 is a block diagram illustrating details of the controller 150, which coordinates operations of the electric system 100, 200, or 300. For simplicity, operations of FIG. 4 will refer back to FIG. 1, though FIG. 4 is also relevant to any of the previous and subsequent FIGS. The controller may control and/or program energy sources 102 and/or 104, and/or the converters 112, 114, 122, 124, 132, and/or 134, to respond to demands for energy from one or more entities, and to one or more problem conditions within the electric system 100. The controller 150 includes hardware, software and/or firmware capable of secure and efficient communication with the energy sources 102 and/or 104, and/or the converters 112, 114, 122, 124, 132, and/or 134, and/or the entities 142 and/or 144, for example, through any of the interfaces previously described (e.g., the interfaces 152, 154, 162, 164, 172, 174, 182, 184, 192, and 194 of FIG. 1). The controller 150 may include an energy distribution engine 402, an energy source controlling engine 406, a converter controlling engine 410, and one or more communication interfaces 412, which may be implemented as the interfaces 152, 154, 162, 164, 172, 174, 182, 184, 192, and/or 194 of FIG. 1.

Any engines referred to may comprise software, hardware, firmware, and/or circuitry to perform and/or coordinate operations. Although engines are described separately to illustrate different concepts, it is contemplated that the engines described separately do not necessarily constitute different or separate physical processors. Rather, any of the engines may be integrated or combined into a single processor.

The controller 150, specifically, the energy distribution engine 402, may control the distribution of energy in response to one or more one or more demands from one or more particular entities (e.g., the entities 142 and/or 144 of FIG. 1). First, the energy distribution engine 402 may obtain one or more demands from the one or more particular entities. The demand for energy may specify energy characteristics of the energy and entity characteristics of the one or more particular entities. In some embodiments, the energy characteristics may include a particular pulsed current profile. Attributes of a particular pulsed current profile may include, without limitation, a duration of a pulse, a rise time, a fall time, a peak pulsed current value, a duty cycle, and/or a shape of a pulse to be distributed. The entity characteristics may specify a type of the entity. For example, the type of entity may specify whether the entity is linear (e.g., resistive) or non-linear (e.g., a diode).

The energy distributing engine 402 may program the energy sources 102 and/or 104, and/or the converters 112, 114, 122, 124, 132, and/or 134 to distribute energy to the one or more particular entities. For example, the energy distributing engine 402 may first determine whether the energy source 102 or 104, or both energy sources, are to supply the energy. This determination may be based on an amount of energy demanded by the one or more particular entities and amounts of available energy at each of the energy sources 102 and 104, a historical amount of available energy, and/or a predicted future amount of available energy at each of the energy sources 102 and 104. For example, if the energy distributing engine 402 determines that the energy source 102 is to supply the energy, the energy distributing engine 402 may communicate with the interface 152 to activate one or more circuits to draw the energy, and communicate with the interface 154 to maintain deactivation of one or more circuits so that energy is not supplied from the energy source 104. The energy distributing engine 402 may communicate with the interfaces 162, 172, 182, and/or 184 to activate the converters 112, 122, 132, and/or 134 to distribute the energy drawn from the energy source 102. In some embodiments, the activation of circuits may encompass switching one or more states of switches within the circuit from ON to OFF and vice versa, and/or otherwise altering programming within the circuits. Additionally, the energy distributing engine 402 may generate a protocol or mechanism, and/or translate the requested energy characteristics provided by the one or more particular entities, to specifically transform the energy to satisfy the requested energy characteristics. The energy distributing engine 402 may program the converter 132 and/or the converter 134 according to the protocol or mechanism.

The energy distributing engine 402 may monitor a status of energy distribution to the one or more particular entities. The status of energy distribution may indicate whether the energy distribution satisfies baseline parameters of distribution. The status of energy distribution may include a rate of distribution of energy, a start time, a stop time, and/or any discontinuities in the energy distribution. In some embodiments, the particular entities may provide feedback to the energy distributing engine 402, via the interfaces 192 and/or 194, regarding a status of the energy distribution. If the parameters of distribution fall outside of baseline parameters, the energy distributing engine 402 may determine a cause and implement a response. For example, the response may include activating an auxiliary energy source and/or an auxiliary converter.

The energy source controlling engine 406 may monitor problem conditions of the energy sources 102 and 104 and address any problem conditions or changes in the problem conditions. In some embodiments, the energy source controlling engine 406 may monitor amounts of available energy in the energy sources 102 and 104. In some embodiments, if the amount of available energy in one energy source (e.g., the energy source 104) decreases to below a threshold level, the energy source controlling engine 406 may initiate a charging process for the energy source 104. The energy source controlling engine 406 may initiate a charging process by causing energy to be drawn from the energy source 102 and/or a different energy source and causing activation of one or more converters to distribute the drawn energy to the energy source 104. For example, if energy from the energy source 102 is being drawn, the energy source controlling engine 406 may communicate with the interface 152 to activate one or more circuits to distribute energy from the energy source 102. The energy source controlling engine 406 may communicate with the interfaces 162, 172, 174, and/or 164 to activate one or more circuits of the converters 112, 122, 124, and/or 114, along a path from the energy source 102 to the energy source 104. The energy source controlling engine 406 may communicate with the interface 154 and cause activation of one or more circuits within the energy source 104 to receive the energy.

In some embodiments, the energy source controlling engine 406 may monitor health statuses of the energy sources 102 and 104 and respond to any deficiencies or abnormalities. In response to detecting an unhealthy status (e.g., excessive leakage, depletion, or compromised ability to store energy) of any of the energy sources 102 and 104, the energy source controlling engine 406 may halt or reduce operation of the energy source affected, and/or initiate operation of an auxiliary energy source.

In some embodiments, additionally or alternatively, the energy source controlling engine 406 may be implemented as the previously described energy source management system 224, and/or the energy source management system 244 previously described in FIG. 2.

The converter controlling engine 410 may monitor problem conditions of any of the converters 112, 114, 122, 124, 132, and 134 and address the problem conditions and/or changes in the problem conditions. In some embodiments, the converter controlling engine 410 may monitor for faults within the converters 112, 114, 122, 124, 132, and 134, via parameters as provided by any of the interfaces 162, 164, 172, 174, 182, and 184. These faults may include any of circuitry malfunctions or driver malfunctions such as defective switches, short circuits, or open circuits, and/or other malfunctions such as harmonic distortion or other waveform defects of waveforms outputted by the converters 112, 114, 122, 124, 132, and/or 134. Upon detecting a fault, the converter controlling engine 410 may change the programming of the converter affected by the fault to operate according to a backup current flow path. The converter controlling engine 410 may communicate with a corresponding interface of the affected converter. If the fault is still unresolved, the converter controlling engine 410 may halt or limit operation of the affected converter and/or initiate operation of an auxiliary converter.

Figure 5:
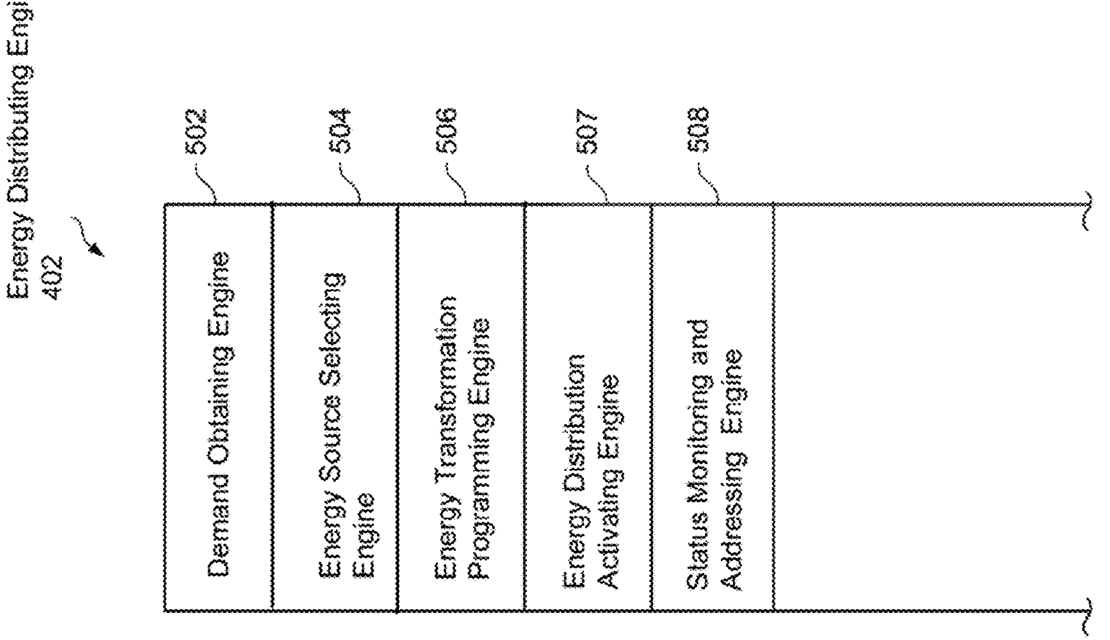
FIG. 5 is a block diagram of an energy distributing engine of the controller shown in FIG. 4, according to some embodiments of the present invention. The energy distributing engine controls distribution of energy from an energy source to an entity demanding the energy.

FIG. 5 is a block diagram illustrating details of the energy distributing engine 402. The energy distributing engine 402 includes hardware, software and/or firmware capable of secure and efficient communication with the energy sources 102 and/or 104, and/or the converters 112, 114, 122, 124, 132, and/or 134, and/or the entities 142 and/or 144, for example, through any of the interfaces previously described (e.g., the interfaces 152, 154, 162, 164, 172, 174, 182, 184, 192, and 194 of FIG. 1). The energy distributing engine 402 includes a demand obtaining engine 502, an energy source selecting engine 504, an energy transformation programming engine 506, and a status monitoring and addressing engine 508.

The demand obtaining engine 502 may be configured to obtain one or more demands from the one or more particular entities. The demand obtaining engine 502 may obtain specified energy characteristics of the energy and entity characteristics of the one or more particular entities. In some embodiments, the energy characteristics may include a particular pulsed current or waveform profile. Attributes of a particular pulsed current profile or waveform profile may include, without limitation, a duration of a pulse, a rise time, a fall time, a peak pulsed current value, a duty cycle, and/or a shape of a pulse to be distributed. The entity characteristics may specify a type of the entity. For example, the type of entity may specify whether the entity is linear (e.g., resistive) or non-linear (e.g., a diode).

The energy source selecting engine 504 may be configured to determine which energy source or sources (e.g., one or both of the energy sources 102 and 104) are to supply the energy to be distributed to the one or more particular entities. The energy source selecting engine 504 may determine the one or more energy sources based on an amount of energy demanded by the one or more particular entities and amounts of available energy at each of the energy sources 102 and 104, a historical amount of available energy, and/or a predicted future amount of available energy at each of the energy sources 102 and 104. Once the energy source selecting engine 504 determines which energy sources to draw energy from, the energy source selecting engine 504 may cause activation of the selected energy sources while maintaining or causing deactivation of the unselected energy sources, as previously described with respect to the energy distributing engine 402.

The energy transformation programming engine 506 may be configured to generate a protocol otherwise translate the energy characteristics provided by the one or more particular entities, to specifically transform the energy to satisfy the requested energy characteristics. The energy transformation programming engine 506 may program the converter 132 and/or the converter 134 (e.g., a buck converter) according to the generated protocol in order to cause the transformation of the energy. Some examples of transformation of the energy may include further compressing or lengthening a duration of the pulse, changing a duty cycle (e.g., a ratio between an ON time and an OFF time) of the pulse, and changing a rise time or a fall time. One example of a protocol is shown in FIG. 3D, which specifies an ON time, an OFF time, a rise time, a fall time, and a number of pulses.

The energy distribution activating engine 507 may be configured to cause distribution and transformation of the energy from the determined one or more energy sources through the converters (e.g., the converters 112, 122 and 132, the converters 112, 122, and 134, the converters 114, 124, and 132, or the converters 114, 124, and 134). The energy distribution activating engine 507 may activate one or more circuitry within the determined one or more energy sources and the converters to permit the energy to be distributed to the one or more particular entities.

The status monitoring and addressing engine 508 may be configured to monitor a status of energy distribution to the one or more particular entities. The status of energy distribution may indicate whether the energy distribution process satisfies baseline parameters of distribution. Parameters of distribution may include, as nonlimiting examples, a rate of distribution of energy, a start time, a stop time, any discontinuities in the energy distribution, and a degree to which the energy being delivered conforms to the specified energy characteristics by the particular entities. In some embodiments, the particular entities may provide feedback to the energy distributing engine 402, via the interfaces 192 and/or 194, regarding a status of the energy distribution. If the parameters of distribution falls outside of baseline parameters, the energy distributing engine 402 may determine a cause and implement a response. For example, the response may include activating an auxiliary energy source and/or an auxiliary converter, and/or changing a programming of the distribution or transformation of the energy.

Figure 6:
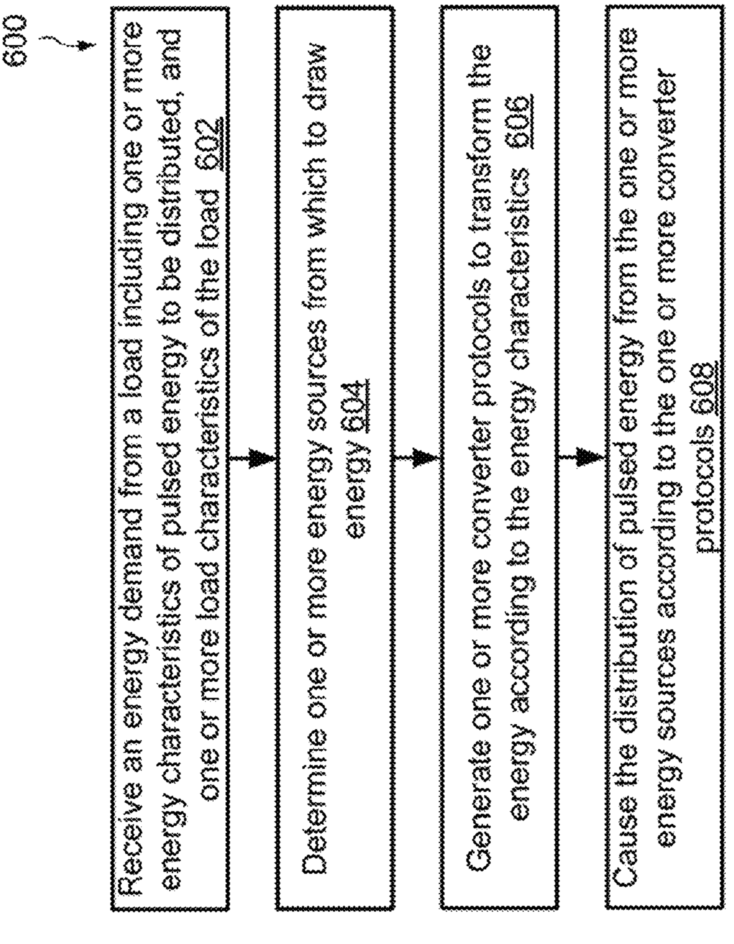
FIG. 6 is a flowchart of a method of controlling distribution of energy according to an energy demand received from an entity, as implemented within an electric system shown in FIGS. 1, 2, and/or 3A, according to some embodiments of the present invention.

FIG. 6 is a flowchart of a method 600 of controlling a distribution of energy according to an energy demand received from an entity, as implemented within an electric system (e.g., the electric system 100 of FIG. 1, the electric system 200 of FIG. 2, or the electric system 300 of FIG. 3A in different embodiments). In this and other flowcharts and/or sequence diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

Method 600 begins with step 602, in which one or more processors (e.g., the controller 150, in particular, the demand obtaining engine 502 of the energy distributing engine 402) receives one or more demands from one or more particular entities (e.g., any of the entities 142 or 144 of FIG. 1). The demands may be associated with a configuration request, which may specify one or more energy characteristics (e.g., a duration of a pulse, a rise time, a fall time, a peak pulsed current value, a duty cycle, an OFF time, an ON time, and a shape of a pulse) of pulsed energy to be distributed to the one or more particular entities. In addition, the demands may be associated with one or more entity characteristics of the entity (e.g., whether the entity is linear or non-linear).

In step 604, one or more processors (e.g., the energy source selecting engine 504) may, in response to the demand obtaining engine 502 receiving one or more demands, determine one or more energy sources (e.g., any of the energy sources 102 and/or 104 in FIG. 1) from which to draw energy. For example, the determining of the one or more energy sources may depend on an availability of energy at each of the energy sources, either current, historical, or predicted. The determining may further depend on how closely a shape of the energy outputted by each of the one or more energy sources resembles the energy characteristics requested by the one or more particular entities.

In step 606, one or more processors (e.g., the energy transformation programming engine 506) may generate one or more protocols or other forms of programming for a converter such as a buck converter (e.g., the converter 132 or 134 of FIG. 1) to transform the energy according to the energy characteristics. One example of a protocol is shown in FIG. 3D, which specifies an ON time, an OFF time, a rise time, a fall time, and a number of pulses.

In step 608, one or more processors (e.g., the energy distribution activating engine 507) may cause distribution and transformation of the energy from the determined one or more energy sources through the converters (e.g., the converters 112, 122 and 132, the converters 112, 122, and 134, the converters 114, 124, and 132, or the converters 114, 124, and 134). The one or more processors may activate one or more circuitry within the determined one or more energy sources and the converters to permit the energy to be distributed to the one or more particular entities. In some embodiments, the controller 150 may, as soon as the demand for energy has been fulfilled, configure circuitry within the electric system 100 to terminate the distribution of energy and charge any of the energy sources 102 and/or 104 during a time period at which no energy is being drawn from the energy sources 102 or 104.

Figure 7:
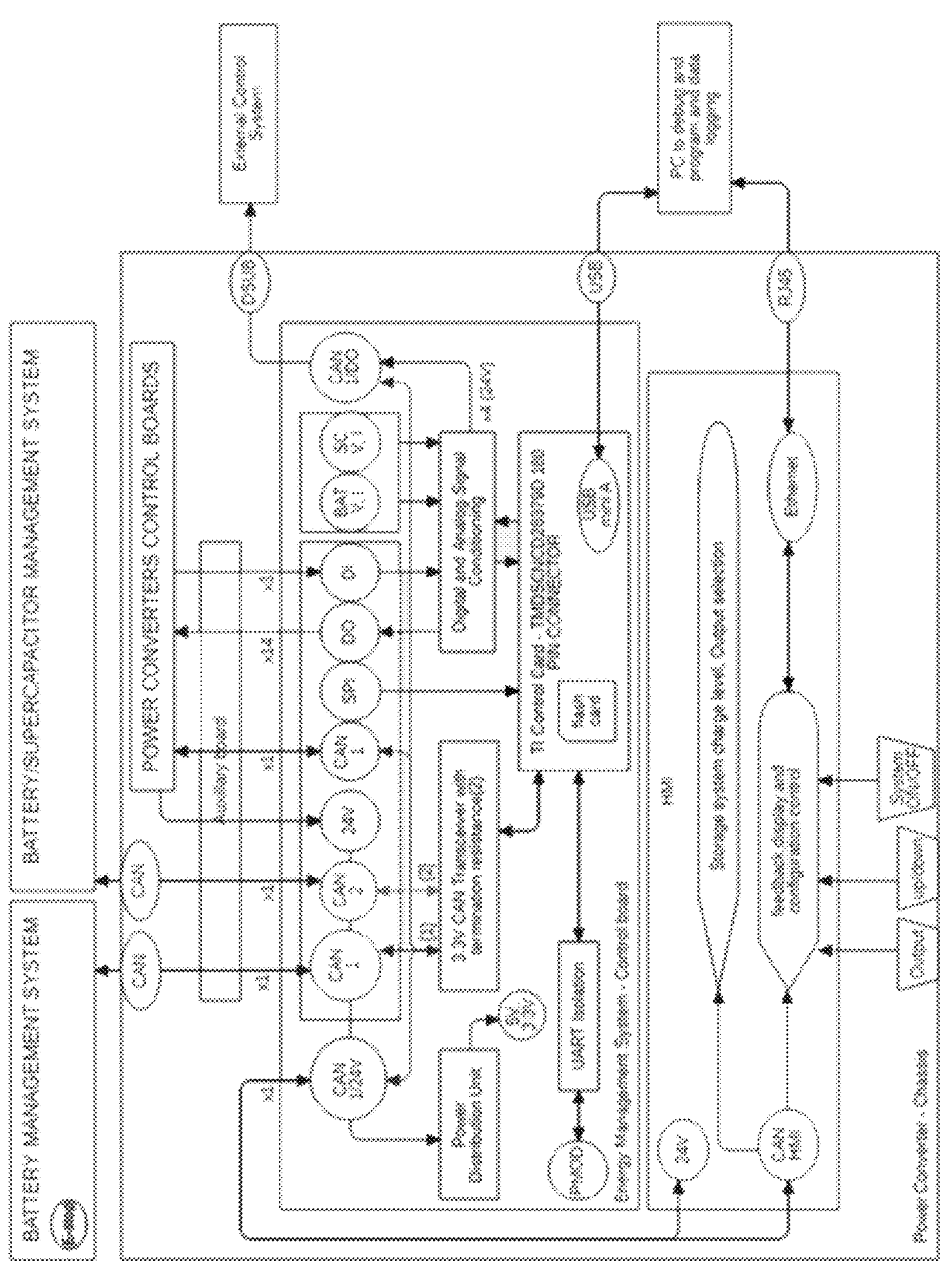
FIGS. 7-9, 10A, 10B, and 11A-11C illustrate details of a human machine interface (HMI), which displays outputs and/or statuses of the electric system shown in FIGS. 1, 2, and/or 3A, according to some embodiments of the present invention.
Figure 8:
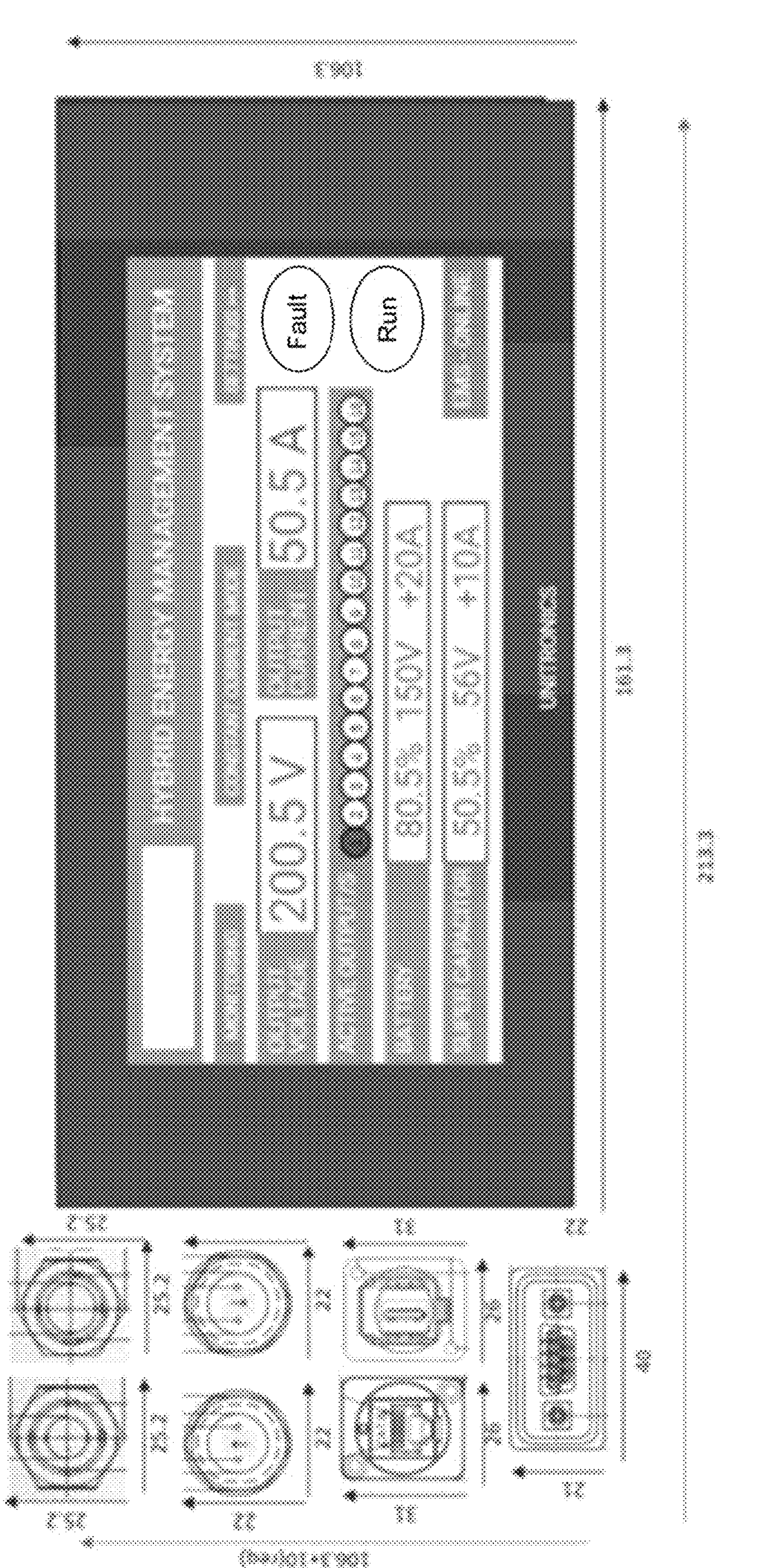
Figure 9:
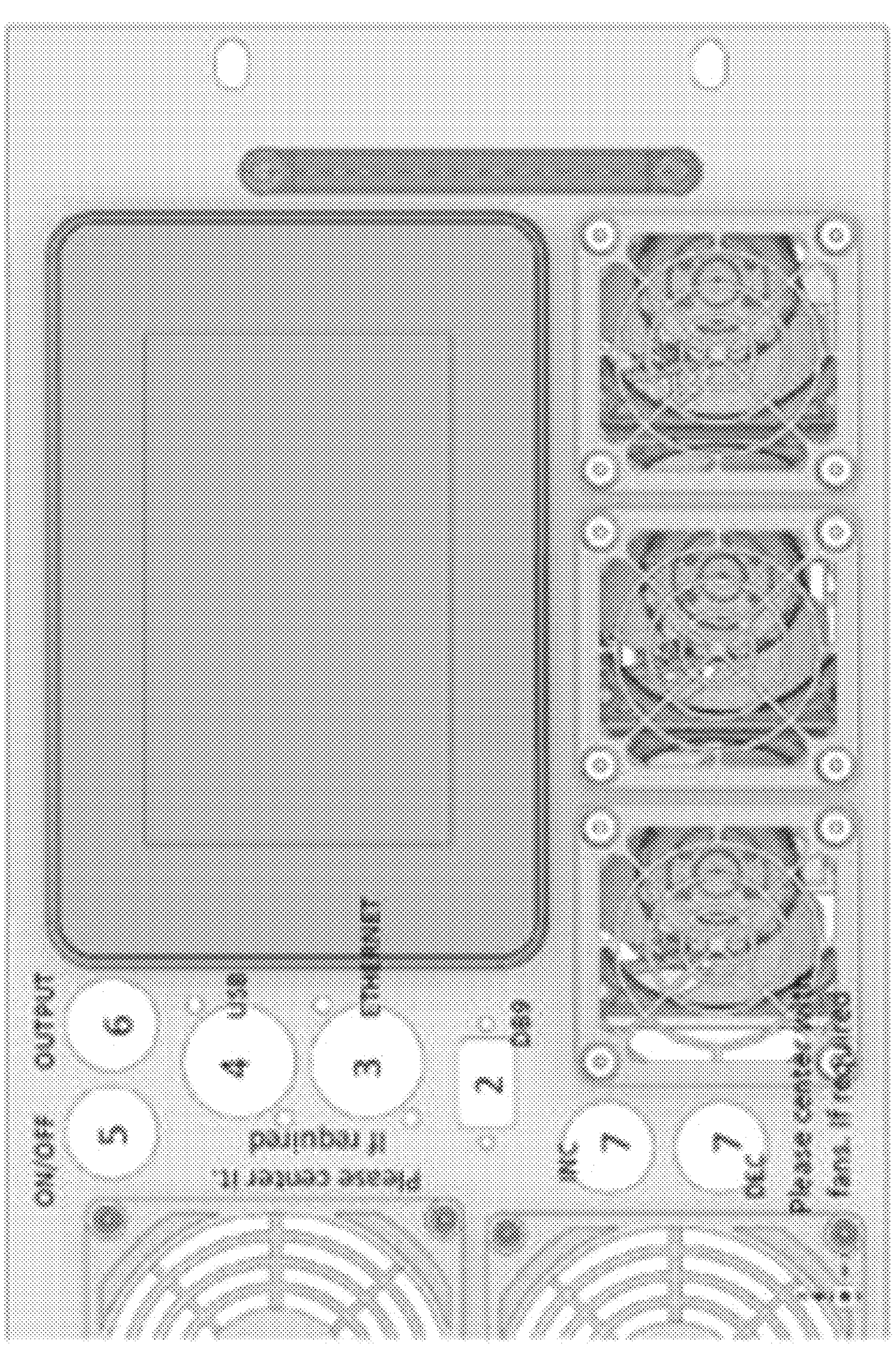
Figure 10B:
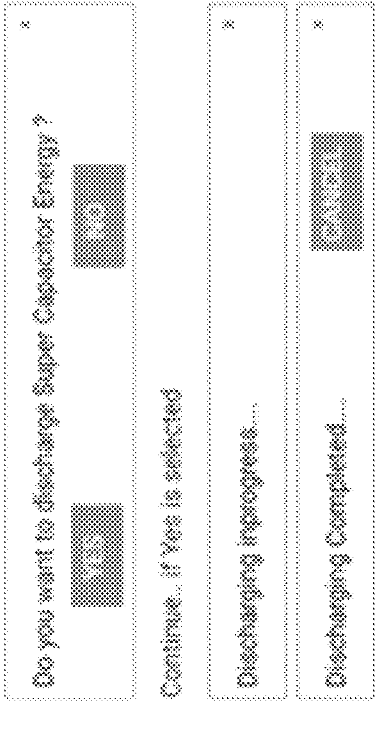
Figure 10B:
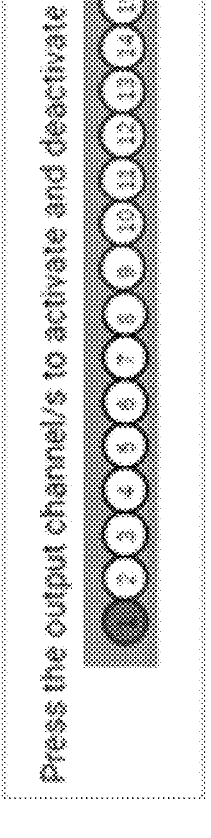
Figure 10B:
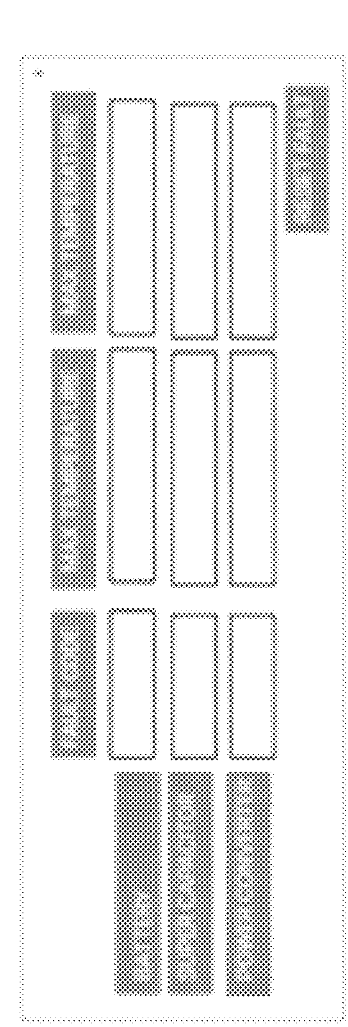

In some embodiments, outputs and/or statuses within the electric system (e.g., the electric system 100 of FIG. 1, the electric system 200 of FIG. 2, and/or the electric system 300 of FIG. 3A in different embodiments) may be displayed on a human machine interface (HMI). FIGS. 7-9, 10A, 10B, and 11A-11C illustrate results of inputs fed into the HMI. FIG. 7 illustrates a diagram of an architecture of how components within the controller 150 are connected and communicate with a human machine interface (HMI). In some embodiments, the controller 150 may contain a control board which receives one or more commands from a human machine interface (HMI). FIG. 8 illustrates a diagram of a panel of a human machine interface (HMI) and connection ports of the HMI. FIG. 9 illustrates a diagram of a chassis on which the HMI is displayed including ports of the chassis. FIG. 10A illustrates a diagram of an example interface presented at the HMI. At the HMI, one or more energy characteristics may be specified, such as ON time, OFF time, rise time, fall time, number of cycles, a DC voltage, a DC current, an overvoltage trip (OVT) threshold, and an overcurrent trip (OCT) threshold. Moreover, the HMI may also display one or more energy storage characteristics at the one or more energy sources (e.g., the energy sources 102 and 104), as well as any faults. FIG. 10B illustrates a diagram of a HMI to implement operations within the electric system, in particular, with the one or more energy sources and the one or more converters.

Figure 11A:
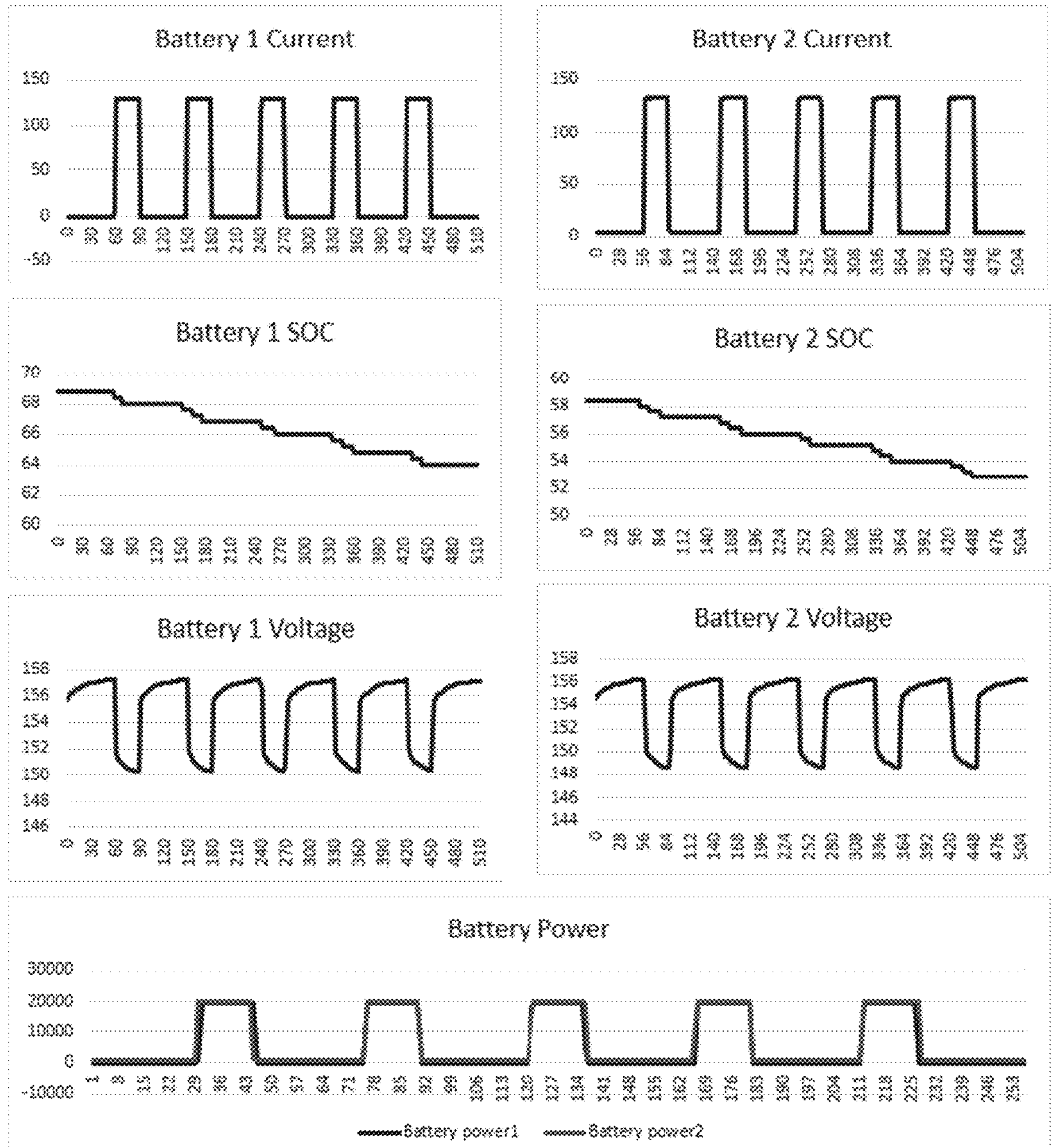
Figure 11B:
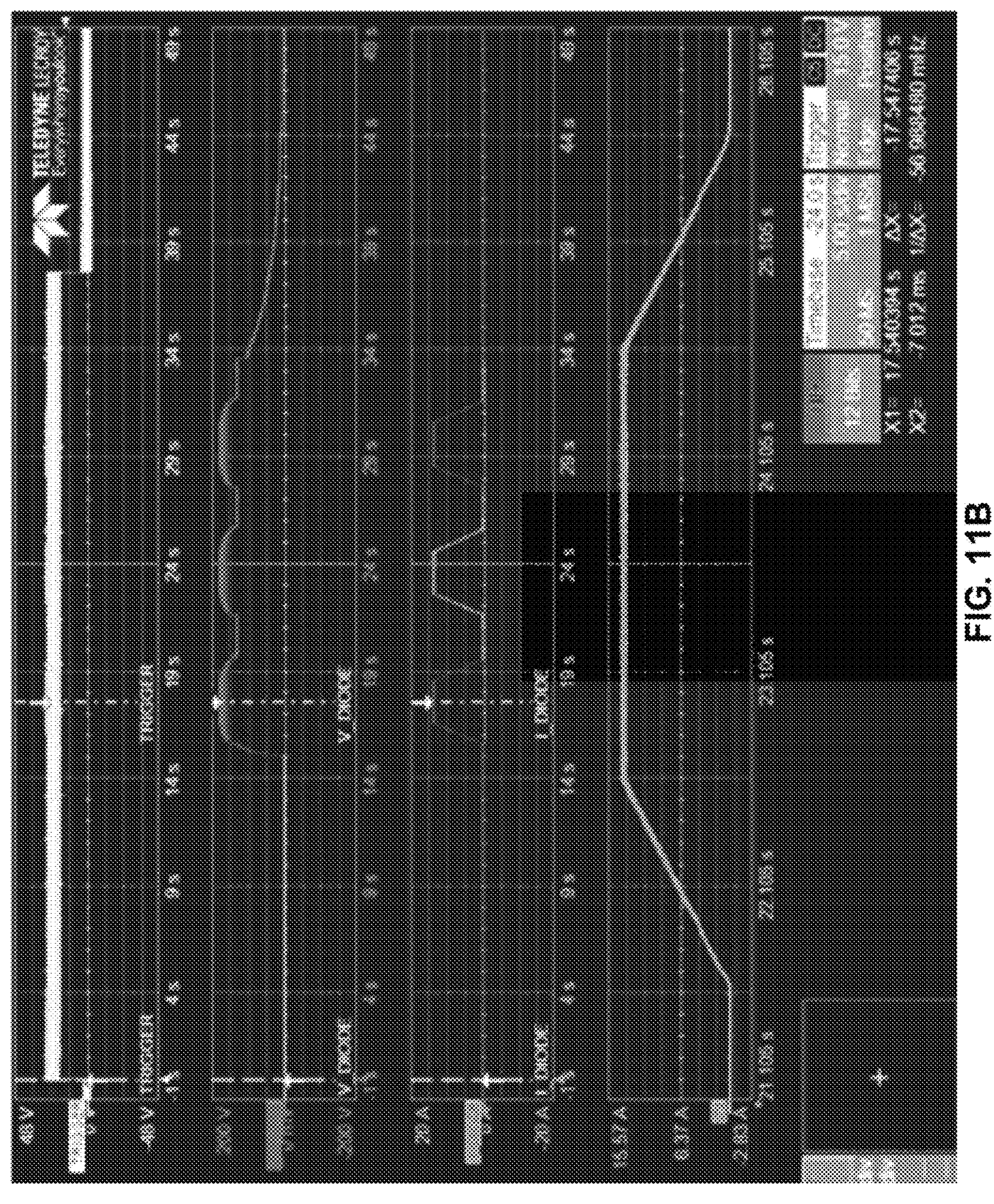
Figure 11C:
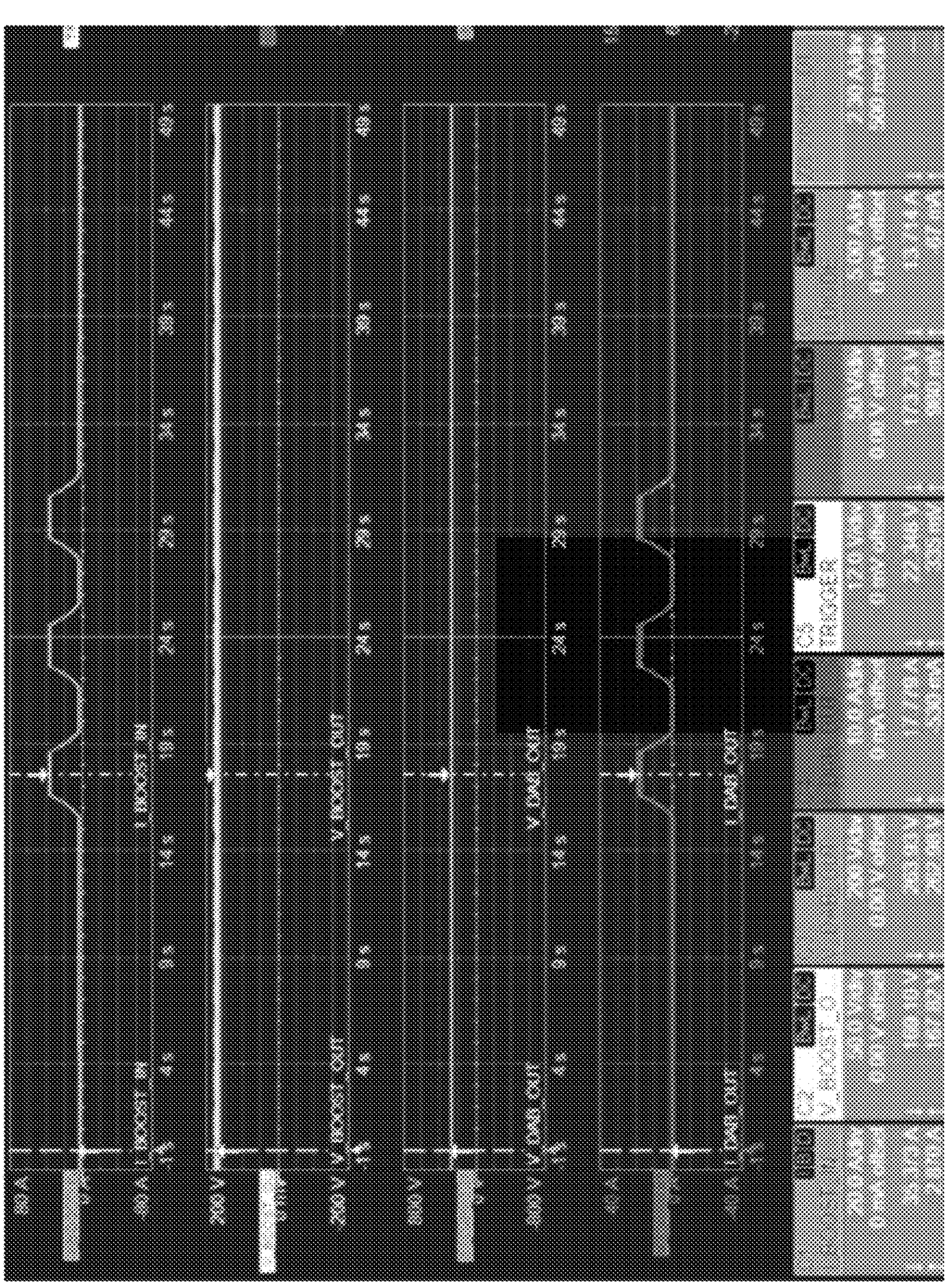

FIG. 11A illustrates diagrams showing characteristics of energy sources, which may be implemented as the energy sources 102 and 104 of FIG. 1. In FIG. 11A, current, voltage, power, and state of charge (SOC) are displayed. The diagrams in FIG. 11A may be displayed on an HMI. FIGS. 11B and 11C illustrates diagrams showing operating parameters of the converters, in particular, input voltages and output voltages over time for a boost converter (e.g., the converter 112 or the converter 114 of FIG. 1) and a DAB (e.g., the converter 122 or the converter 124 of FIG. 1).

Tables 4 and 5 below show example lists of information controlled and displayed between the controller 150 and the HMI using a CAN 2.0 B communication protocol. Table 6 illustrates an example mapping of pins between the HMI components and the controller 150.

TABLE 4

Examples of information controlled and displayed between the controller 150 and the HMI using a CAN 2.0 B communication protocol are shown.

| Information | CANID | Start byte | Start bit | Bit length | Range | Period | Description |
|---|---|---|---|---|---|---|---|
| HMI - ON/OFF | HMI to control card | 0 | 0 | 4 | 1 and 8 | 100 ms | Set 1 - ON; 8 - OFF |
| Output - Start/Stop | 0x1811A1A2 | 0 | 4 | 4 | 1 and 8 | | Set 1 - Start; 8 - Stop |
| Discharge Supercapacitor? | | 1 | 8 | 8 | 1 and 8 | | Set 1 - Yes; 8 - No |

TABLE 4-continued

Examples of information controlled and displayed between the controller 150 and the HMI using a CAN 2.0 B communication protocol are shown.

| Information | CANID | Start byte | Start bit | Bit length | Range | Period | Description |
|---|---|---|---|---|---|---|---|
| Output selection | | 2 | 16 | 16 | 16 bits | | Set 16 channels as Bitwise ON/OFF |
| Reset Fault | | 4 | 32 | 8 | 1 and 8 | | Set 1 - ON when pressed; 8 - others |
| DC Voltage (V) | HMI to control card | 0 | 0 | 16 | 10 to 270 | | Set Constant DC Voltage |
| OCT (A) | 0x1812A1A2 | 2 | 16 | 16 | 0 to 15 | | Set Over Current Trip |
| DC Current (A) | | 4 | 32 | 16 | 0 to 15 | | Set Constant DC Current |
| OVT (V) | | 6 | 48 | 16 | 10 to 270 | | Set Over Voltage Trip |
| Operating mode | HMI to control card 0x1813A1A2 | 0 | 0 | 4 | 1 and 8 | | Set 1 - Constant Current; 8 - Constant Voltage |
| Active outputs | | 0 | 4 | 4 | 0 to 16 | | Set active outputs |
| Power Cycles | | 1 | 8 | 8 | 1 to 20 | | Set number of power cycles |
| On-Time(s) | | 2 | 16 | 8 | 0 to 30 | | Set ON Time in seconds |
| OFF Time(s) | | 3 | 24 | 8 | 60 to 600 | | Set OFF Time in seconds |
| Rise Time (ms) | | 4 | 32 | 16 | 40 to 1000 | | Set Rise Time in milliseconds |
| Fall time (ms) | | 6 | 48 | 16 | 40 to 1000 | | Set Fall Time in milliseconds |

TABLE 5

Further examples of information controlled and displayed between the controller 150 and the HMI using a CAN 2.0 B communication protocol are shown.

| Information | CANID | Start byte | Start bit | Bit length | Range | Period | Description |
|---|---|---|---|---|---|---|---|
| Control Card - ON/OFF | control card to HMI 0x1801A2A1 | 0 | 0 | 4 | 1 and 8 | 100 ms | FB: 1 - Connected; 8 - disconnected |
| Output Status - Start/Stop | | 0 | 4 | 4 | 1 and 8 | | AK: 1 - Running; 8 - Stopped |
| Supercapacitor Discharge Status | | 1 | 8 | 8 | 1 and 8 | | AK: 1 - Yes; 8 - No |
| Output selection | | 2 | 16 | 16 | 16 bits | | AK: 16 channel as Bitwise ON/OFF |
| Reset Fault | | 4 | 32 | 8 | 1 and 8 | | AK 1 - ON; 8 - OFF(not used) |
| DC Voltage (V) | control card to HMI | 0 | 0 | 16 | 10 to 270 | | AK: Constant DC Voltage |
| OCT (A) | 0x1802A2A1 | 2 | 16 | 16 | 0 to 15 | | AK: Over Current Trip |
| DC Current (A) | | 4 | 32 | 16 | 0 to 15 | | AK: Constant DC Current |
| OVT (V) | | 6 | 48 | 16 | 10 to 270 | | AK: Over Voltage Trip |
| Operating mode | HMI to control card 0x1803A2A1 | 0 | 0 | 4 | 1 and 8 | | AK: 1 - Constant Current; 8 - Constant Voltage |

TABLE 5-continued

Further examples of information controlled and displayed between the controller 150 and the HMI using a CAN 2.0 B communication protocol are shown.

| Information | CANID | Start byte | Start bit | Bit length | Range | Period | Description |
|---|---|---|---|---|---|---|---|
| Active outputs | | 0 | 4 | 4 | 0 to 16 | | AK: Active outputs |
| Power Cycles | | 1 | 8 | 8 | 1 to 20 | | AK: number of power cycles |
| On-Time(s) | | 2 | 16 | 8 | 0 to 30 | | AK: ON Time in seconds |
| OFF Time(s) | | 3 | 24 | 8 | 60 to 600 | | AK: OFF Time in seconds |
| Rise Time (ms) | | 4 | 32 | 16 | 40 to 1000 | | AK: Rise Time in milliseconds |
| Fall time (ms) | | 6 | 48 | 16 | 40 to 1000 | | AK: Fall Time in milliseconds |
| PCCS_1 - DC Voltage (V) | control card to HMI 0x1804A2A1 | 0 | 0 | 16 | 0 to 3000 | | FB: DC Voltage for channel 1 = V*0.1 |
| PCCS_1 - DC Current (A) | | 2 | 16 | 16 | −1400 to 1400 | | FB: DC Current for channel 1 = I*0.1 |
| PCCS_1 - Fault Status | | 4 | 32 | 8 | 0 and others | | FB: others - fault; 0x0000 - no fault |
| PCCS_1 - Max Temp | | 5 | 40 | 8 | 0 to 250 | | FB: max temp = T*0.6 |
| PCCS_1 - Min Temp | | 6 | 48 | 8 | 0 to 250 | | FB: min temp = T*0.6 |
| BMS - Battery Voltage (V) | control card to HMI 0x1805A2A1 | 0 | 0 | 16 | 0 to 2000 | | FB: Battery Voltage = V*0.1 |
| BMS - Battery Percentage (%) | | 2 | 16 | 8 | 0 to 250 | | FB: Battery charge in percentage = P*0.4 |
| BMS - Fault Status | | 3 | 24 | 8 | 0 and others | | FB: others - fault; 0x0000 - no fault |
| BMS - Current | | 4 | 32 | 16 | −2500 to 2500 | | FB: DC Current = I*0.1 |
| BMS - Max Temp | | 6 | 48 | 8 | 0 to 250 | | FB: max temp = T*0.6 |
| BMS - Min Temp | | 7 | 56 | 8 | 0 to 250 | | FB: min temp = T*0.6 |
| UMS - Super Cap Voltage (V) | control card to HMI 0x1806A2A1 | 0 | 0 | 16 | 0 to 2000 | | FB: Super Capacitor Voltage = V*0.1 |
| UMS - Super Cap Percentage (%) | | 2 | 16 | 8 | 0 to 250 | | FB: Supercapacitor charge in percentage = P*0.4 |
| UMS - Fault Status | | 3 | 24 | 8 | 0 and others | | FB: others - fault; 0x0000 - no fault |
| UMS - Current | | 4 | 32 | 16 | −5000 to 5000 | | FB: DC Current = I*0.1 |
| UMS - Max Temp | | 6 | 48 | 8 | 0 to 250 | | FB: max temp = T*0.6 |
| UMS - Min Temp | | 7 | 56 | 8 | 0 to 250 | | FB: min temp = T*0.6 |
| PCCS_2 - DC Voltage (V) | control card to HMI 0x1807A2A1 | 0 | 0 | 16 | 0 to 3000 | | FB: DC Voltage for channel 2 = V*0.1 |
| PCCS_2 - DC Current (A) | | 2 | 16 | 16 | −1400 to 1400 | | FB: DC Current for channel 2 = I*0.1 |

TABLE 5-continued

Further examples of information controlled and displayed between the controller 150 and the HMI using a CAN 2.0 B communication protocol are shown.

| Information | CANID | Start byte | Start bit | Bit length | Range | Period | Description |
|---|---|---|---|---|---|---|---|
| PCCS_3 - DC Voltage | | 4 | 32 | 16 | 0 to 3000 | | FB: DC Voltage for channel 3 = V*0.1 |
| PCCS_3 - DC Current | | 6 | 48 | 16 | −1400 to 1400 | | FB: DC Current for channel 3 = I*0.1 |
| PCCS_4 - DC Voltage (V) | control card to HMI 0x1808A2A1 | 0 | 0 | 16 | 0 to 3000 | | FB: DC Voltage for channel 4 = V*0.1 |
| PCCS_4 - DC Current (A) | | 2 | 16 | 16 | −1400 to 1400 | | FB: DC Current for channel 4 = I*0.1 |
| PCCS_5 - DC Voltage | | 4 | 32 | 16 | 0 to 3000 | | FB: DC Voltage for channel 5 = V*0.1 |
| PCCS_5 - DC Current | | 6 | 48 | 16 | −1400 to 1400 | | FB: DC Current for channel 5 = I*0.1 |
| PCCS_6 - DC Voltage (V) | control card to HMI 0x1809A2A1 | 0 | 0 | 16 | 0 to 3000 | | FB: DC Voltage for channel 6 = V*0.1 |
| PCCS_6 - DC Current (A) | | 2 | 16 | 16 | −1400 to 1400 | | FB: DC Current for channel 6 = I*0.1 |
| PCCS_7 - DC Voltage | | 4 | 32 | 16 | 0 to 3000 | | FB: DC Voltage for channel 7 = V*0.1 |
| PCCS_7 - DC Current | | 6 | 48 | 16 | −1400 to 1400 | | FB: DC Current for channel 7 = I*0.1 |
| PCCS_8 - DC Voltage (V) | control card to HMI 0x180AA2A1 | 0 | 0 | 16 | 0 to 3000 | | FB: DC Voltage for channel 8 = V*0.1 |
| PCCS_8 - DC Current (A) | | 2 | 16 | 16 | −1400 to 1400 | | FB: DC Current for channel 8 = I*0.1 |
| PCCS_9 - DC Voltage | | 4 | 32 | 16 | 0 to 3000 | | FB: DC Voltage for channel 9 = V*0.1 |
| PCCS_9 - DC Current | | 6 | 48 | 16 | −1400 to 1400 | | FB: DC Current for channel 9 = I*0.1 |
| PCCS_10 - DC Voltage (V) | control card to HMI 0x180BA2A1 | 0 | 0 | 16 | 0 to 3000 | | FB: DC Voltage for channel 10 = V*0.1 |
| PCCS_10 - DC Current (A) | | 2 | 16 | 16 | −1400 to 1400 | | FB: DC Current for channel 10 = I*0.1 |
| PCCS_11 - DC Voltage | | 4 | 32 | 16 | 0 to 3000 | | FB: DC Voltage for channel 11 = V*0.1 |
| PCCS_11 - DC Current | | 6 | 48 | 16 | −1400 to 1400 | | FB: DC Current for channel 11 = I*0.1 |

TABLE 5-continued

Further examples of information controlled and displayed between the controller 150 and the HMI using a CAN 2.0 B communication protocol are shown.

| Information | CANID | Start byte | Start bit | Bit length | Range | Period | Description |
|---|---|---|---|---|---|---|---|
| PCCS_12 - DC Voltage (V) | control card to HMI 0x180CA2A1 | 0 | 0 | 16 | 0 to 3000 | | FB: DC Voltage for channel 12 = V*0.1 |
| PCCS_12 - DC Current (A) | | 2 | 16 | 16 | −1400 to 1400 | | FB: DC Current for channel 12 = I*0.1 |
| PCCS_13 - DC Voltage | | 4 | 32 | 16 | 0 to 3000 | | FB: DC Voltage for channel 13 = V*0.1 |
| PCCS_13 - DC Current | | 6 | 48 | 16 | −1400 to 1400 | | FB: DC Current for channel 13 = I*0.1 |
| PCCS_14 - DC Voltage (V) | control card to HMI 0x180DA2A1 | 0 | 0 | 16 | 0 to 3000 | | FB: DC Voltage for channel 14 = V*0.1 |
| PCCS_14 - DC Current (A) | | 2 | 16 | 16 | −1400 to 1400 | | FB: DC Current for channel 14 = I*0.1 |
| PCCS_15 - DC Voltage | | 4 | 32 | 16 | 0 to 3000 | | FB: DC Voltage for channel 15 = V*0.1 |
| PCCS_15 - DC Current | | 6 | 48 | 16 | −1400 to 1400 | | FB: DC Current for channel 15 = I*0.1 |
| PCCS_16 - DC Voltage (V) | control card to HMI 0x180EA2A1 | 0 | 0 | 16 | 0 to 3000 | | FB: DC Voltage for channel 16 = V*0.1 |
| PCCS_16 - DC Current (A) | | 2 | 16 | 16 | −1400 to 1400 | | FB: DC Current for channel 16 = I*0.1 |

TABLE 6

An example mapping of pins between the HMI components and the controller 150 is shown.

| Unistream 5 | | | | | | | | | |
|---|---|---|---|---|---|---|---|---|---|
| Digital Inputs | | Digital Outputs | | Power Connector | | CAN Connector | | EMS | |
| 1 | 0VDC | 15 | 24VDC | +V | 24VDC | +V | 24VDC | 1 | CAN_LOW_HMI |
| 2 | DI_1 | 14 | DO_1 | 0V | 0VDC | H | CAN_HIGH_HMI | 2 | CAN_HIGH_HMI |
| 3 | DI_2 | 13 | DO_2 | S | NC | S | NC | 3 | 24VDC |
| 4 | DI_3 | | | | | L | CAN_LOW_HMI | 4 | 0VDC |
| 5 | DI_4 | | | | | −V | 0VDC | 5 | CAN_LOW_SUBD |
| | | | | | | | | 6 | CAN_HIGH_SUBD |
| | | | | | | | | 7 | 24VDC |
| | | | | | | | | 8 | 0VDC |

TABLE 6-continued

An example mapping of pins between the HMI components and the controller 150 is shown.

| HMI Components | | | | | | | | | |
|---|---|---|---|---|---|---|---|---|---|
| Output On/Off | | HMI On/Off | | Up Button | | Down Button | | DB9 | |
| 1 | NA | 1 | NA | 1 | 24VDC | 1 | 24VDC | 2 | CAN_LOW_SUBD |
| 2 | NA | 2 | NA | 2 | DI_1 | 2 | DI_2 | 3 | 0_VDC |
| 3 | DI_4 | 3 | 24VDC | | | | | 7 | CAN_HIGH_SUBD |
| 4 | 24VDC | 4 | DI_3 | | | | | 9 | 24VDC |
| + | DO_1 | + | DO_2 | | | | | | |
| − | 0_VDC | − | 0_VDC | | | | | | |

Figure 12:
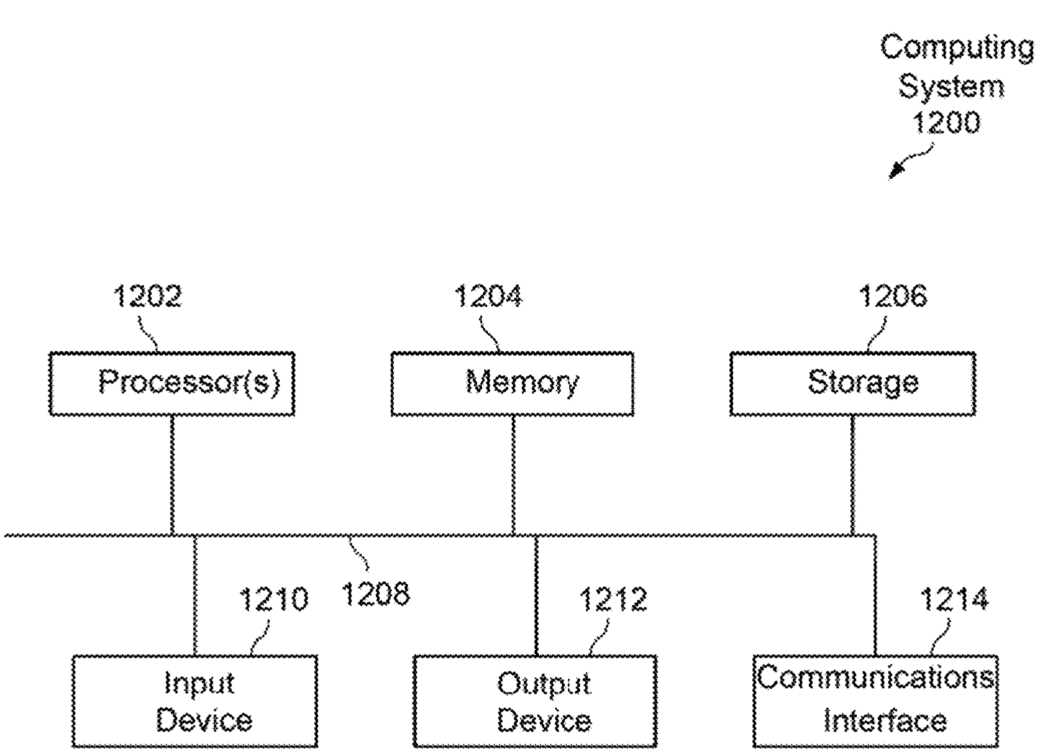
FIG. 12 is a block diagram of a computing system, according to some embodiments of the present invention.

FIG. 12 is a block diagram of a computing system 1200. Any of the controller 150 and/or engines described herein may comprise an instance of one or more computing systems 1200. In some embodiments, functionality of the computing system 1200 is improved to perform some or all of the functionality described herein. The computing system 1200 comprises a processor 1202, memory 1204, storage 1206, an input device 1210, a communication network interface 1214, and an output device 1212 communicatively coupled to a communication channel 1208. The processor 1202 is configured to execute executable instructions (e.g., programs), and may be implemented as the controller 160. In some embodiments, the processor 1202 comprises circuitry or any processor capable of processing the executable instructions.

The memory 1204 stores data. Some examples of memory 1204 include storage devices, such as RAM, ROM, RAM cache, virtual memory, etc. In various embodiments, working data is stored within the memory 1204. The data within the memory 1204 may be cleared or ultimately transferred to the storage 1206.

The storage 1206 includes any storage configured to retrieve and store data. Some examples of the storage 1206 include flash drives, hard drives, optical drives, cloud storage, and/or magnetic tape. In some embodiments, storage 1206 may include RAM. Each of the memory 1204 and the storage 1206 comprises a computer-readable medium, which stores instructions or programs executable by processor 1202.

The input device 1210 may be any device that inputs data (e.g., mouse and keyboard). The output device 1212 may be any device that outputs data and/or processed data (e.g., a speaker or display). It will be appreciated that the storage 1206, input device 1210, and output device 1212 may be optional. For example, the routers/switchers may comprise the processor 1202 and memory 1204 as well as a device to receive and output data (e.g., the communication network interface 1214 and/or the output device 1212).

The communication network interface 1214 may be coupled to a network (e.g., the network 162) via the link 1208. The communication network interface 1214 may support communication over an Ethernet connection, a serial connection, a parallel connection, and/or an ATA connection. The communication network interface 1214 may also support wireless communication (e.g., 802.11 a/b/g/n, WiMax, LTE, WiFi). It will be apparent that the communication network interface 1214 may support many wired and wireless standards.

It will be appreciated that the hardware elements of the computing system 1200 are not limited to those depicted. A computing system 1200 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1002 and/or a co-processor located on a GPU (i.e., NVidia).

It will be appreciated that an "engine," "system," "datastore," and/or "controller" may comprise software, hardware, firmware, and/or circuitry. In one example, one or more software programs comprising instructions capable of being executable by a processor may perform one or more of the functions of the engines, systems, datastores, and/or controller described herein. In another example, circuitry may perform the same or similar functions. Alternative embodiments may comprise more, less, or functionally equivalent engines, systems, datastores, or databases, and still be within the scope of present embodiments. For example, the functionality of the various engines, systems, datastores, and/or controller may be combined or divided differently. The datastores may include cloud storage. It will further be appreciated that the term "or." as used herein, may be construed in either an inclusive or exclusive sense. Moreover, plural instances may be provided for resources, operations, or structures described herein as a single instance. It will be appreciated that the term "request" shall include any computer request or instruction, whether permissive or mandatory.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or controller described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines.

In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. References to "approximately" may be construed to encompass values within a certain range of the specified value, such as within 25 percent, 10 percent, 5 percent, 1 percent, or any other applicable value. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system for distributing electric energy, the electric energy comprising pulsed energy, the system comprising:

one or more first converters coupled to one or more generative energy sources and configured to distribute first electric energy from the one or more generative energy sources to one or more entities;

one or more second converters coupled to one or more non-generative energy sources and configured to distribute second electric energy from the one or more non-generative energy sources to the one or more entities;

one or more interfaces coupled to the one or more generative energy sources, to the one or more non-generative energy sources, to the one or more first converters, to the one or more second converters, and to the one or more entities; and a controller coupled to the one or more interfaces, the controller comprising:

one or more hardware processors; and memory storing computer instructions, the computer instructions when executed by the one or more hardware processors configured to perform:

receiving, from a particular entity of the one or more entities, a demand for particular electric energy, the demand indicating one or more electric characteristics of the particular electric energy and one or more entity characteristics of the particular entity;

in response to the demand, controlling the one or more first converters and the one or more second converters to distribute at least a portion of the particular electric energy from at least one of the one or more generative energy sources or at least one of the one or more non-generative energy sources to the particular entity according to the one or more electric characteristics, the one or more entity characteristics, and one or more energy characteristics of the at least one of the one or more generative energy sources or the at least one of the one or more non-generative energy sources; and after the at least one of the one or more non-generative energy sources has used at least a portion of its available electric energy, using the one or more generative energy sources to transfer charging energy to the at least one of the one or more non-generative energy sources.

2. The system of claim 1, wherein the computer instructions when executed by the one or more hardware processors are configured further to perform:

monitoring available electric energy at the one or more generative energy sources or the one or more non-generative energy sources; and based on the available electric energy, controlling the one or more first converters and the one or more second converters to re-distribute the at least a portion of the particular electric energy from a different energy source to the one or more particular energy sources.

3. The system of claim 1, wherein at least one of the one or more first converters and one or more second converters comprises a boost converter, a dual active bridge (DAB), or a buck converter.

4. The system of claim 1, wherein the one or more non-generative energy sources further comprises a battery.

5. The system of claim 1, wherein the one or more non-generative energy sources further comprises a supercapacitor.

6. The system of claim 1, wherein the one or more electric characteristics comprises any of a duration of a pulse, a rise time, a fall time, a peak pulsed current value, a duty cycle, an OFF time, an ON time, and a shape of a pulse.

7. The system of claim 1, wherein the one or more entity characteristics indicate whether the particular entity is linear or non-linear.

8. The system of claim 7, wherein the controlling the one or more first converters and the one or more second converters to distribute the at least a portion of the particular electric energy comprises:

controlling the one or more first converters and the one or more second converters to distribute the at least a portion of the particular electric energy in a form of a charging current to the particular entity until a voltage of the particular entity reaches a threshold voltage, wherein the charging current fails to satisfy at least one of the electric characteristics; and upon the voltage of the particular entity reaching the threshold voltage, controlling the one or more first converters and the one or more second converters to distribute the at least a portion of the particular electric energy in a form of an entity current, wherein the entity current satisfies the one or more electric characteristics.

9. The system of claim 1, wherein the one or more energy characteristics comprises energy availability at the one or more regenerative energy sources and the one or more non-generative energy sources; and wherein the controlling the one or more first converters and the one or more second converters to distribute the at least a portion of the particular electric energy comprises controlling the one or more first converters and the one or more second converters to draw the at least a portion of the particular electric energy from a first set one or more particular energy sources of the one or more generative energy sources and the one or more non-generative energy sources based on the energy availability.

10. The system of claim 9, wherein the computer instructions when executed by the one or more hardware processors are further configured to perform:

in response to determining that energy availability at the one or more particular energy sources falls below a threshold, controlling the one or more first converters and the one or more second converters to redistribute the at least a portion of the particular electric energy from a different set of one or more particular energy sources.

11. The system of claim 1, wherein the computer instructions when executed by the one or more hardware processors are further configured to perform:

monitoring for one or more faults; and implementing a response mechanism in response to detecting a particular fault.

12. The system of claim 1, wherein the computer instructions when executed by the one or more hardware processors are further configured to perform:

causing transmission of the at least a portion of the particular electric energy initially through a high-resistance path to mitigate an inrush of current from the one or more particular energy sources to an input capacitor of the one or more first converters and the one or more second converters, when a capacitance of the input capacitor is below a threshold capacitance; and causing transmission of the at least a portion of the particular electric energy through a low-resistance path, when the capacitance of the input capacitor reaches and exceeds the threshold capacitance.

13. A method performed in an electric system, the electric system comprising one or more first converters coupled to one or more generative energy sources and configured to distribute first electric energy from the one or more generative energy sources to one or more entities; one or more second converters coupled to one or more non-generative energy sources and configured to distribute second electric energy from the one or more non-generative energy sources to the one or more entities; one or more interfaces coupled to the one or more generative energy sources, to the one or more non-generative energy sources, to the one or more first converters, to the one or more second converters, and to the one or more entities; and a controller coupled to the one or more interfaces, the method comprising:

receiving, from a particular entity of the one or more entities, a demand for particular electric energy, the demand indicating one or more electric characteristics of the particular electric energy and one or more entity characteristics of the particular entity;

in response to the demand, controlling the one or more first converters and the one or more second converters to distribute at least a portion of the particular electric energy from at least one of the one or more generative energy sources or at least one of the one or more non-generative energy sources to the particular entity according to the one or more electric characteristics, the one or more entity characteristics, and one or more energy characteristics of the at least one of the one or more generative energy sources or the at least one of the one or more non-generative energy sources; and after the at least one of the one or more non-generative energy sources has used at least a portion of its available electric energy, using the one or more generative energy sources to transfer charging energy to the at least one of the one or more non-generative energy sources.

14. The method of claim 13, further comprising:

monitoring available electric energy at the one or more generative energy sources or the one or more non-generative energy sources; and based on the available electric energy, controlling the one or more first converters and the one or more second converters to re-distribute the at least a portion of the particular electric energy from a different energy source to the one or more particular energy sources.

15. The method of claim 13, wherein at least one of the one or more first converters and one or more second converters comprises a boost converter, a dual active bridge (DAB), or a buck converter.

16. The method of claim 13, wherein the one or more entity characteristics indicate whether the particular entity is linear or non-linear.

17. The method of claim 16, wherein the controlling the one or more first converters and the one or more second converters to distribute the at least a portion of the particular electric energy comprises:

controlling the one or more first converters and the one or more second converters to distribute the at least a portion of the particular electric energy in a form of a charging current to the particular entity until a voltage of the particular entity reaches a threshold voltage, wherein the charging current fails to satisfy at least one of the electric characteristics; and upon the voltage of the particular entity reaching the threshold voltage, controlling the one or more first converters and the one or more second converters to distribute the at least a portion of the particular electric energy in a form of an entity current, wherein the entity current satisfies the one or more electric characteristics.

18. The method of claim 13, wherein the one or more energy characteristics comprises energy availability at the one or more regenerative energy sources and the one or more non-generative energy sources; and wherein the controlling the one or more first converters and the one or more second converters to distribute the at least a portion of the particular electric energy comprises controlling the one or more first converters and the one or more second converters to draw the at least a portion of the particular electric energy from a first set of one or more particular energy sources of the one or more generative energy sources and the one or more non-generative energy sources based on the energy availability.

19. The method of claim 18, further comprising in response to determining that energy availability at the one or more particular energy sources falls below a threshold, controlling the one or more first converters and the one or more second converters to redistribute the at least a portion of the particular electric energy from a different set of one or more particular energy sources.

20. The method of claim 13, further comprising:

monitoring for one or more faults; and implementing a response mechanism in response to detecting a particular fault.

21. The method of claim 13, further comprising:

causing transmission of the at least a portion of the particular electric energy initially through a high-resistance path to mitigate an inrush of current from the one or more particular energy sources to an input capacitor of the one or more first converters and the one or more second converters, when a capacitance of the input capacitor is below a threshold capacitance; and causing transmission of the at least a portion of the particular electric energy through a low-resistance path, when the capacitance of the input capacitor reaches and exceeds the threshold capacitance.

* * * * *